(12) United States Patent
Sato et al.

(10) Patent No.: US 12,179,252 B2
(45) Date of Patent: Dec. 31, 2024

(54) TOOL CHANGER

(71) Applicant: Amada Co., Ltd., Kanagawa (JP)

(72) Inventors: Masaaki Sato, Kanagawa (JP); Shiro Hayashi, Kanagawa (JP); Shingo Kamada, Kanagawa (JP); Hideto Yamada, Kanagawa (JP); Yohei Yamaguchi, Kanagawa (JP)

(73) Assignee: AMADA CO., LTD., Kanagawa (JP)

( * ) Notice: Subject to any disclaimer, the term of this patent is extended or adjusted under 35 U.S.C. 154(b) by 1025 days.

(21) Appl. No.: 17/259,959

(22) PCT Filed: Jul. 17, 2019

(86) PCT No.: PCT/JP2019/028031
§ 371 (c)(1),
(2) Date: Jan. 13, 2021

(87) PCT Pub. No.: WO2020/017537
PCT Pub. Date: Jan. 23, 2020

(65) Prior Publication Data
US 2021/0323046 A1 Oct. 21, 2021

(30) Foreign Application Priority Data

Jul. 17, 2018 (JP) .................................. 2018-134151
Jul. 17, 2018 (JP) .................................. 2018-134168
(Continued)

(51) Int. Cl.
*B21D 5/02* (2006.01)
*B21D 37/04* (2006.01)
(Continued)

(52) U.S. Cl.
CPC ............. *B21D 5/0254* (2013.01); *B21D 5/02* (2013.01); *B21D 5/0209* (2013.01);
(Continued)

(58) Field of Classification Search
CPC .............. Y10T 483/1729–1731; B21D 5/0254
(Continued)

(56) References Cited

U.S. PATENT DOCUMENTS 7,168,286 B1   1/2007   Pelech
7,632,224 B2   12/2009  Rouweler et al.
(Continued)

FOREIGN PATENT DOCUMENTS

CN   101081478 A   12/2007
CN   105992658 A   10/2016
(Continued)

OTHER PUBLICATIONS

Translation of Written Opinion for corresponding Application No. PCT/JP2019/028031, mailed Oct. 21, 2019.*
(Continued)

*Primary Examiner* — Erica E Cadugan
(74) *Attorney, Agent, or Firm* — Renner, Otto, Boisselle & Sklar, LLP

(57) ABSTRACT

A tool changer includes a slider provided behind (or in front of) a table of a press brake, and configured to slide in a right-left direction along a tool installation part of the table, a finger provided in the slider, and configured to be inserted into an engagement hole extending through a tool and to move in a front-rear direction, and an engagement member configured to be protruded and retracted relative to an outer peripheral surface of the finger on a tip side, and to be engaged with a peripheral edge portion of the engagement hole of the tool (or an inner stepped portion formed at an intermediate position of the engagement hole).

10 Claims, 25 Drawing Sheets

(30) Foreign Application Priority Data

| | | |
|---|---|---|
| Jul. 27, 2018 | (JP) | 2018-140886 |
| Sep. 11, 2018 | (JP) | 2018-169366 |
| May 7, 2019 | (JP) | 2019-087437 |
| May 16, 2019 | (JP) | 2019-092892 |
| Jun. 12, 2019 | (JP) | 2019-109717 |
| Jun. 14, 2019 | (JP) | 2019-111277 |
| Jul. 8, 2019 | (JP) | 2019-126935 |

(51) Int. Cl.
  *B21D 37/14* (2006.01)
  *B23Q 3/155* (2006.01)

(52) U.S. Cl.
  CPC ........... *B21D 5/0236* (2013.01); *B21D 37/04* (2013.01); *B21D 37/145* (2013.01); *Y10T 483/1731* (2015.01); *Y10T 483/18* (2015.01)

(58) Field of Classification Search
  USPC ...................................................... 483/28–29
  See application file for complete search history.

(56) References Cited

U.S. PATENT DOCUMENTS

| | | | |
|---|---|---|---|
| 10,500,623 | B2 | 12/2019 | Meneghetti |
| 12,023,724 | B2* | 7/2024 | Sato .................... B21D 37/145 |
| 2003/0064871 | A1 | 4/2003 | Akami et al. |
| 2007/0271987 | A1 | 11/2007 | Shimizu et al. |
| 2007/0297889 | A1 | 12/2007 | Rouweler |
| 2014/0326036 | A1 | 11/2014 | Hayashi |
| 2016/0354821 | A1 | 12/2016 | Meneghetti |
| 2017/0239701 | A1* | 8/2017 | Denkmeier .......... B21D 5/0254 |
| 2022/0226876 | A1* | 7/2022 | Sato .................... B21D 5/0236 |

FOREIGN PATENT DOCUMENTS

| | | |
|---|---|---|
| CN | 106 734 644 A | 5/2017 |
| DE | 100 60 405 B4 | 3/2007 |
| EP | 1 160 024 A1 | 12/2001 |
| EP | 1862255 A1 | 12/2007 |
| IT | UA-20164119 A1 * | 12/2017 |
| JP | S58 76326 U | 5/1983 |
| JP | 6-234018 A | 8/1994 |
| JP | H09 220618 A | 8/1997 |
| JP | H10211521 A | 8/1998 |
| JP | H10263708 A | 10/1998 |
| JP | H1110235 A | 1/1999 |
| JP | 2000071028 A | 3/2000 |
| JP | 2004337950 A | 12/2001 |
| JP | 2006000855 A | 1/2006 |
| JP | 4558852 B2 | 10/2010 |
| JP | 4672868 B2 | 4/2011 |
| JP | 2013111610 A | 6/2013 |
| JP | 5252837 B2 | 7/2013 |
| JP | 2014-91137 A | 5/2014 |
| JP | 5841800 B2 | 1/2016 |
| JP | 2018-001196 A | 1/2018 |
| WO | 2008050458 A1 | 5/2008 |
| WO | 2015118505 A3 | 8/2015 |
| WO | 2016 023057 A1 | 2/2016 |
| WO | 2016 054668 A1 | 4/2016 |
| WO | 2017212386 A1 | 12/2017 |
| WO | 2018065965 A1 | 4/2018 |

OTHER PUBLICATIONS

Machine translation of ITUA-20164119-A1, which IT '119 was published Dec. 2017.*
Extended European Search Report for corresponding EP Application No. 19837570.1, dated Aug. 12, 2021.
Extended European Search Report for corresponding EP Application No. 19838694.8, dated Aug. 6, 2021.
Extended European Search Report for corresponding EP Application No. 19838058.6, dated Aug. 6, 2021.
European Search Report for corresponding Application No. 20805835.4, mailed May 30, 2022.
European Search Report for corresponding Application No. 20802239.2, mailed May 23, 2022.
Extended European Search Report for corresponding EP Application No. 19837688.1, mailed Aug. 2, 2021.
International Search Report for corresponding Application No. PCT/JP2019/028031, mailed Oct. 21, 2019.

* cited by examiner

Fig. 9
(a)
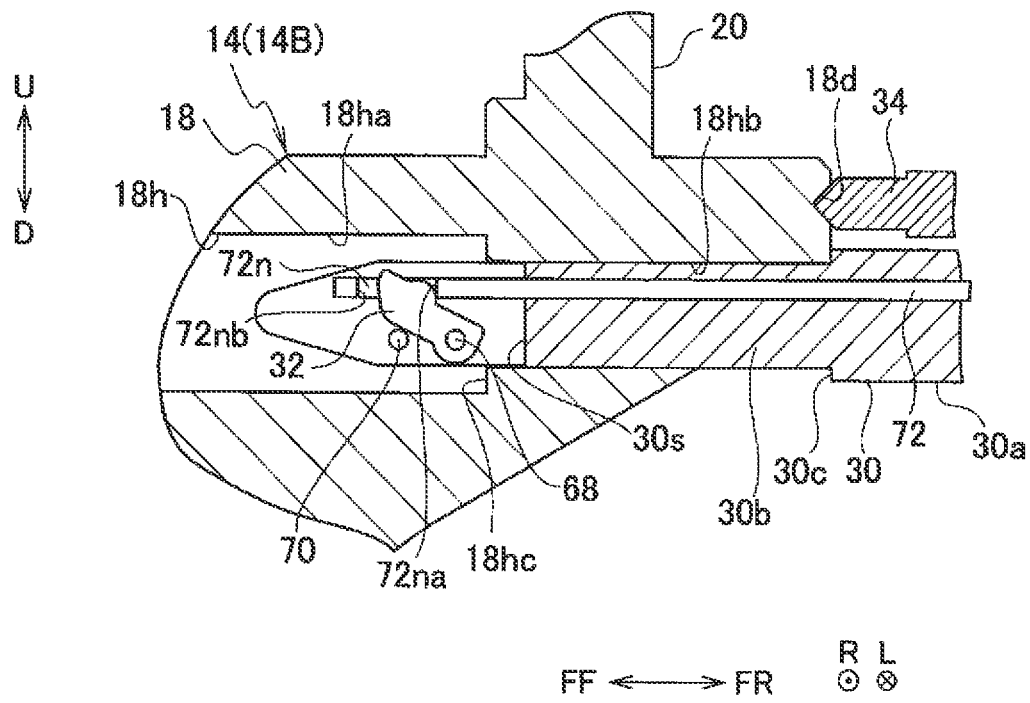
(b)
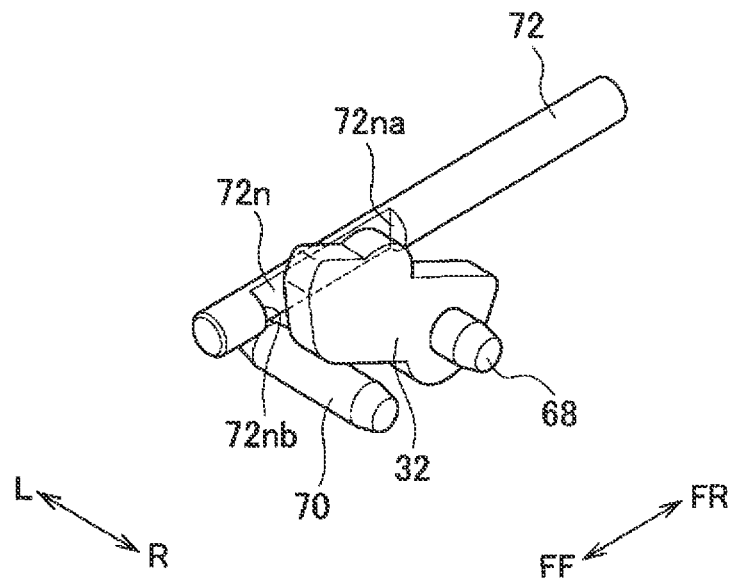

Fig. 10
(a)
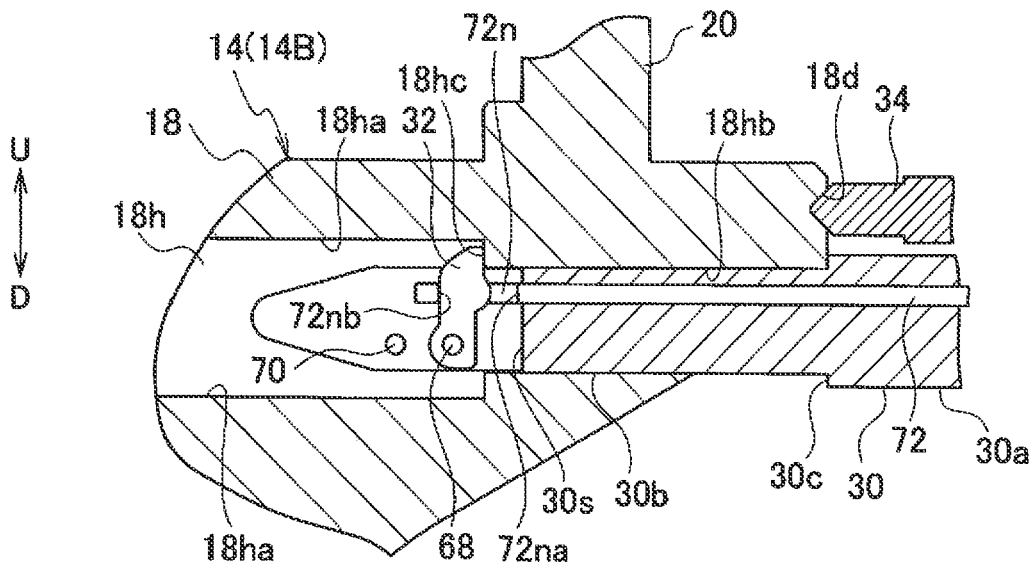
(b)
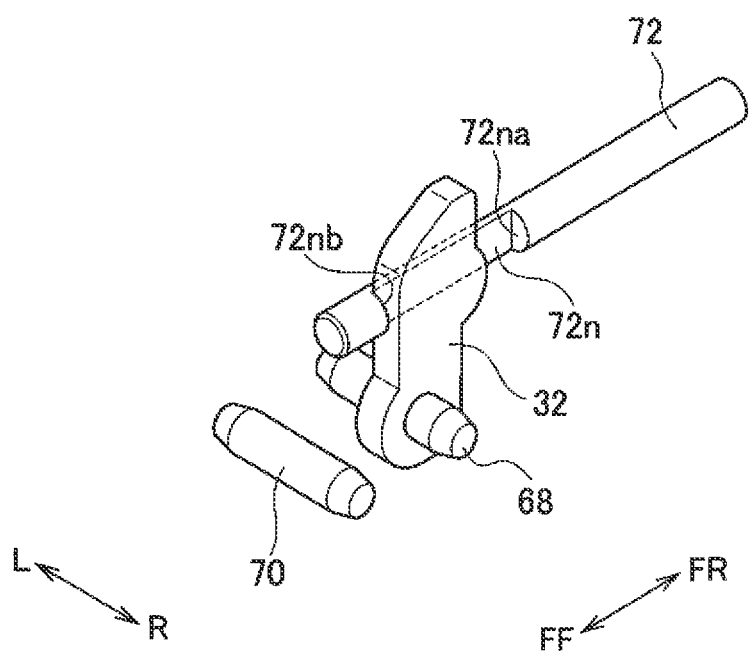

Fig. 12
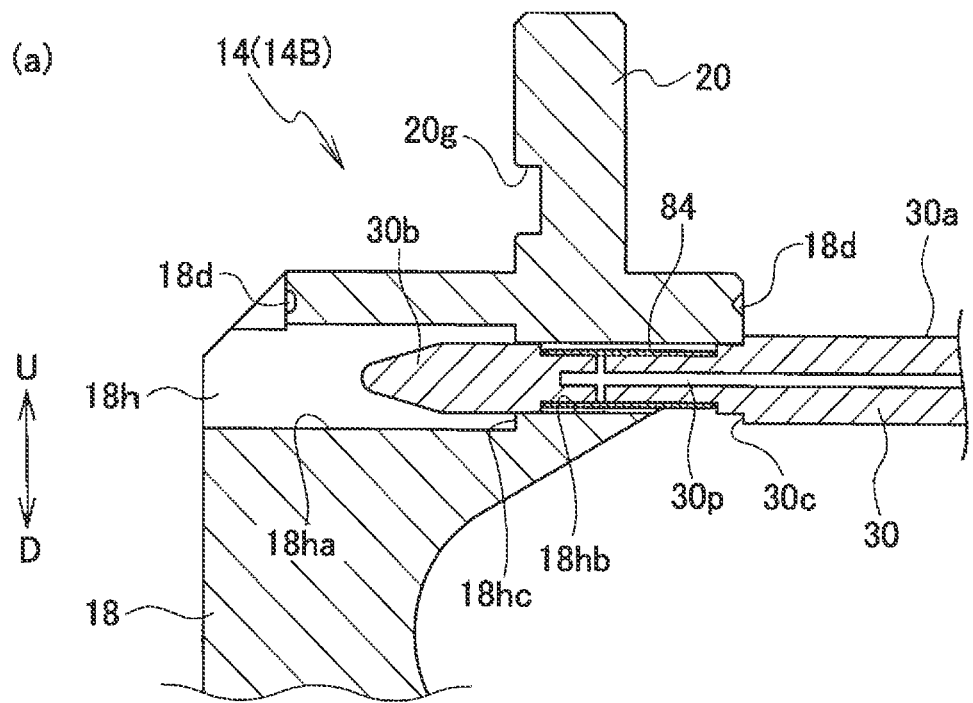
(a)
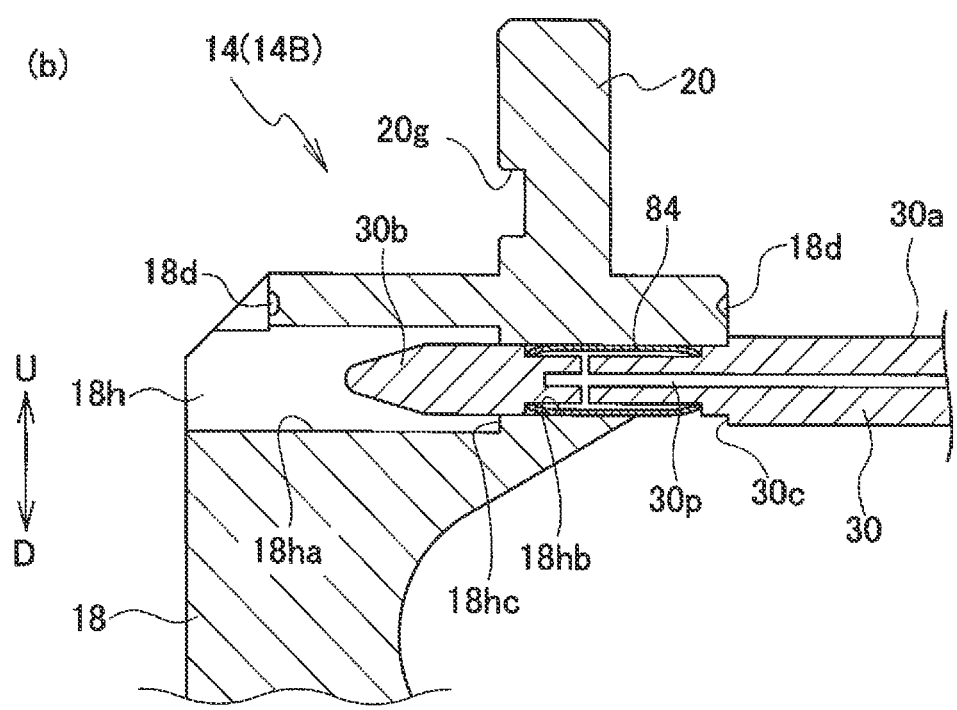
(b)
FF ⟵⟶ FR   R L
            ⊙ ⊗

TOOL CHANGER

TECHNICAL FIELD

The present invention relates to a tool changer that automatically changes a tool for a tool installation part provided in a table of a press brake.

BACKGROUND ART

To automatically change a tool for a tool installation part of a press brake, an automatic tool changer (ATC) may be used (see Patent Literatures 1 and 2 below). Patent Literatures 1 and 2 disclose an upper tool as a tool to be automatically changed.

The upper tool disclosed in Patent Literatures 1 and 2 comprises a tool main body. On a base end side (an upper end side) of the tool main body, an attachment portion (a shank) to be detachably attached to the tool installation part of the press brake is formed. side (the base end side) of the tool main body, a bending portion to bend a plate-shaped workpiece is formed. In each of opposite surfaces (a front surface and a back surface) of the attachment portion, a V-shaped groove engaged with a locking piece of the tool installation part is formed along a lateral direction.

Below the V-shaped groove in the surface of the attachment portion, an accommodation depressed portion extending in a vertical direction is formed. In the accommodation depressed portion, an anti-drop operation member extending in the vertical direction is accommodated movably in a thickness direction (a direction along a thickness of a tool). At an upper end of the operation member, an engagement protrusion that is engageable in an engagement groove of the tool installation part is provided. Then, at a lower end of the operation member, a push button to release an engaged state of the engagement protrusion in the engagement groove of the tool installation part is provided. Additionally, for the tool to be automatically changed as disclosed in Patent Literatures 1 and 2, an elongated hole, into which a hook member of the tool changer is inserted for operating the push button, extends through the tool below the push button in the thickness direction. The elongated hole is formed to be long in the vertical direction.

Note that in addition to Patent Literatures 1 and 2, Patent Literatures 3 and 4 described below are also associated prior technical literatures.

CITATION LIST

Patent Literatures

Patent Literature 1: Japanese Patent No. 4558852
Patent Literature 2: Japanese Patent No. 4672868
Patent Literature 3: Japanese Patent Laid-Open No. 2018-1196
Patent Literature 4: Japanese Patent No. 5841800

SUMMARY OF INVENTION

For a tool to be automatically changed as disclosed in Patent Literatures 1 and 2, as components to automatically change a tool for a tool installation part of a press brake, an operation member extending in a vertical direction, and elongated holes extending in the vertical direction and arranged in series to the operation member in the vertical direction are required. That is, a height of the tool to be automatically changed as disclosed in Patent Literatures 1 and 2 is larger than a height of a usual tool. Therefore, the usual tool cannot be modified to form the tool to be automatically changed, by postprocessing. Furthermore, each elongated hole extending in the vertical direction is much harder to be processed than a round hole, and much time is required for production of the tool to be automatically changed.

An object of the present invention is to provide a tool changer suitable to automatically change a tool for a press rake which is easy to produce.

A first feature of the present invention provides a tool changer including a slider provided on a back surface side or a front surface side of a table of a press brake, and configured to slide in a right left direction along a tool installation part of the table, a finger provided in the slider, configured to be inserted into an engagement hole extending through a tool and to move in a front-rear direction, and configured to support the tool, and an engagement member configured to be protruded and retracted relative to an outer peripheral surface of the finger on a tip side, and to be engaged with a peripheral edge portion of the engagement hole of the tool or an inner stepped portion formed at an intermediate position of the engagement hole.

The finger may include a large-diameter portion on a base end side, include a small-diameter portion configured to be inserted into the engagement hole of the tool on a tip side, and include an outer stepped portion configured to abut on the tool between the large-diameter portion and the small-diameter portion. In this case, the finer may be configured to clamp the tool between the engagement member protruded from the outer peripheral surface on the tip side and the outer stepped portion. Furthermore, the engagement member may be provided to be swingable in an up-down direction, in a slit formed in a tip portion of the finger.

The tool changer may further include an anti-rotation member configured to prevent rotation of the tool supported by the finger. In this case, a tip portion of the anti-rotation member may be engageable in an anti-rotation depressed portion formed in a vicinity of the engagement hole of the tool. Furthermore, the anti-rotation member may include a plurality of anti-rotation members, and each of tip portions of the plurality of anti-rotation members may be engageable in a corresponding anti-rotation depressed portion of the tool. In this case, the plurality of anti-rotation members may be arranged in a linearly symmetrical manner to a virtual vertical line (a center line in the up-down direction) passing an axial center of the finger.

The anti-rotation member may be formed in a flat plate shape, and be surface-contactable with the tool. The anti-rotation member may be contactable with the tool supported by the finger from one side in the right-left direction. The anti-rotation member may be contactable with a tip of the tool supported by the finger.

A second feature of the present invention provides tool changer including a slider provided on a back surface side or a front surface side of a table in a press brake, and configured to slide in a right-left direction along a tool installation part of the table, a finger provide in the slider, configured to be inserted into a hole extending through a tool and to move in a front-rear direction, and configured to support the tool, and an anti-rotation member provided in the finger, and configured to prevent rotation of the tool supported by the finger and to move in the front-rear direction.

BRIEF DESCRIPTION OF DRAWINGS

FIG. 9(a) is a side cross-sectional view showing a behavior prior to engagement of an engagement piece in an inner stepped portion of an engagement hole, and FIG. 9(b) is a perspective view showing a behavior that the engagement piece is pushed by a push face of the finger to abut on a stopper.

FIG. 10(a) is a cross-sectional view showing a behavior that the engagement piece is engaged with the inner stepped portion of the engagement hole, and FIG. 10(b) is a perspective view showing a behavior that the engagement piece is pulled up with a pull face of the finger.

FIG. 12(a) is a cross-sectional view showing a behavior before an elastic tube is expanded, and FIG. 12(b) is a cross-sectional view showing a behavior that the expanded elastic tube is pressed into contact with an inner surface of the engagement hole.

DESCRIPTION OF EMBODIMENT

Figure 1:
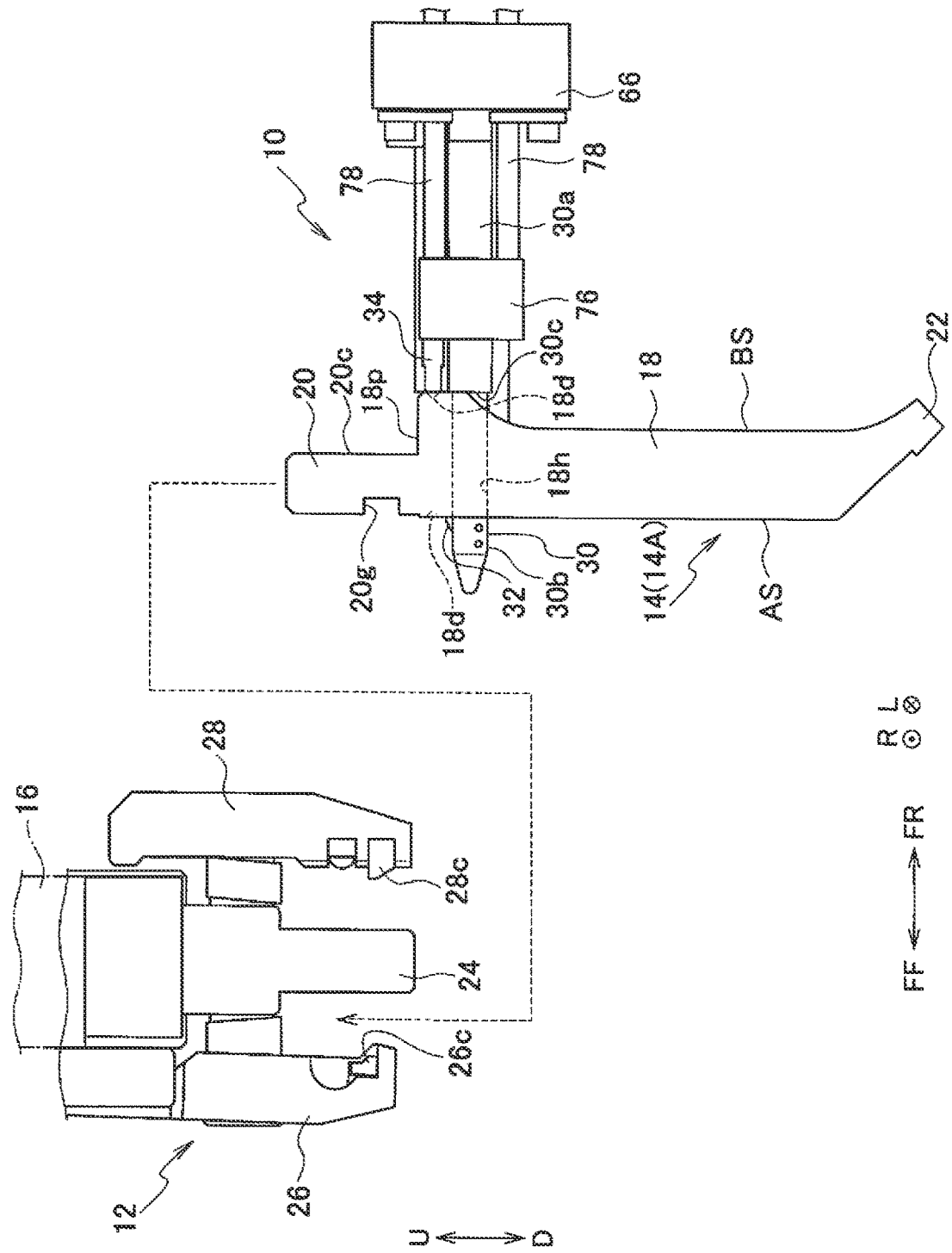
FIG. 1 is a side view showing a standard type upper tool held in a tool changer according to a first embodiment, and an upper tool holder of a press brake.

Description will be made as to a tool changer according to an embodiment with reference to the drawings.

Note that hereinafter, "provided" includes, in addition to being directly provided, being provided indirectly via a separate member. In the drawings, "FF" indicates a front direction, "FR" indicates a rear direction, "I" indicates a left direction, "R" indicates a right direction, "U" indicates an up direction, and "D" indicates a down direction.

First Embodiment

Figure 2:
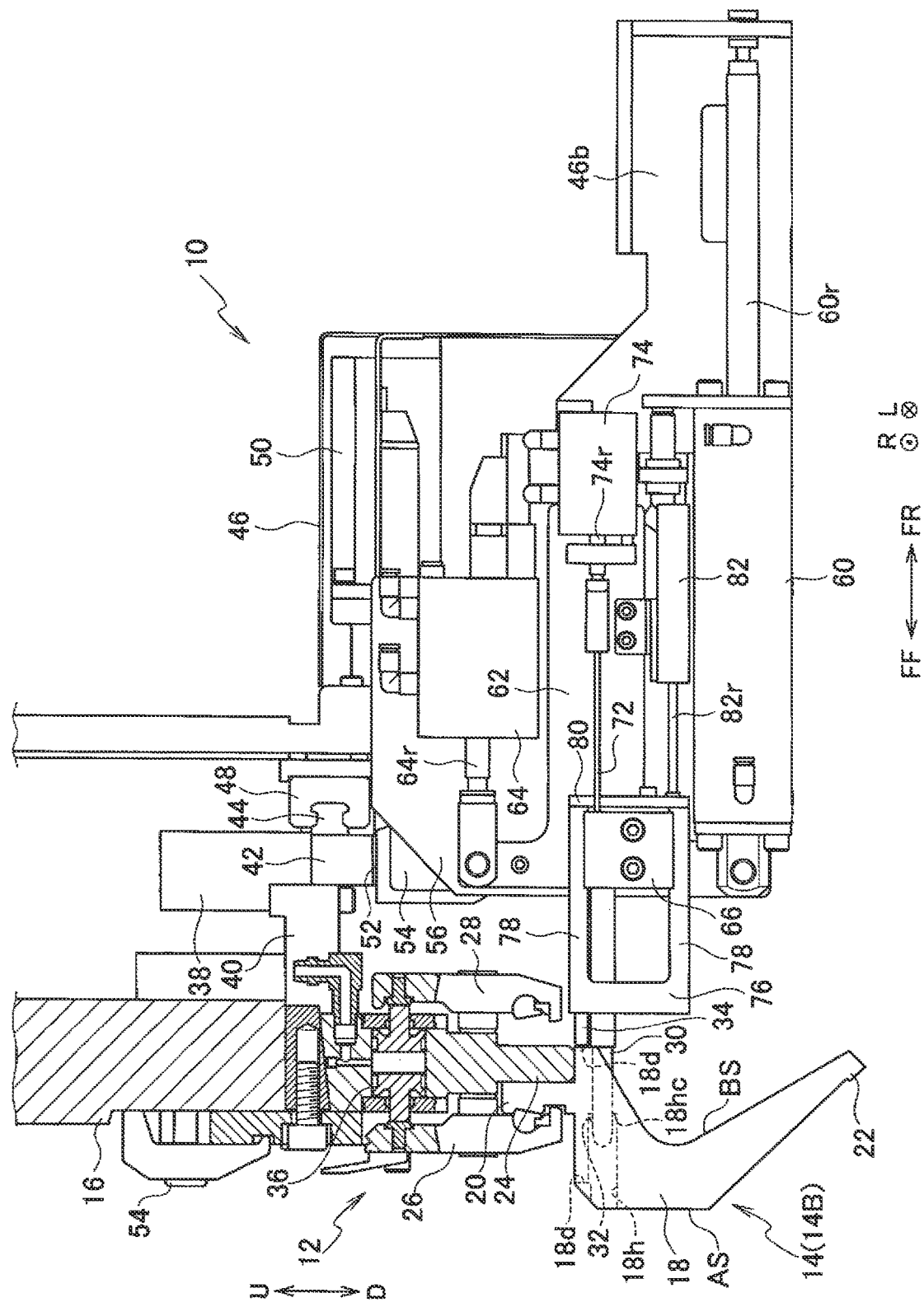
FIG. 2 is a side view (partially cross sectional) showing a goose-neck type upper tool attached to the upper tool holder of the press brake by the tool changer according to the first embodiment.
Figure 3:
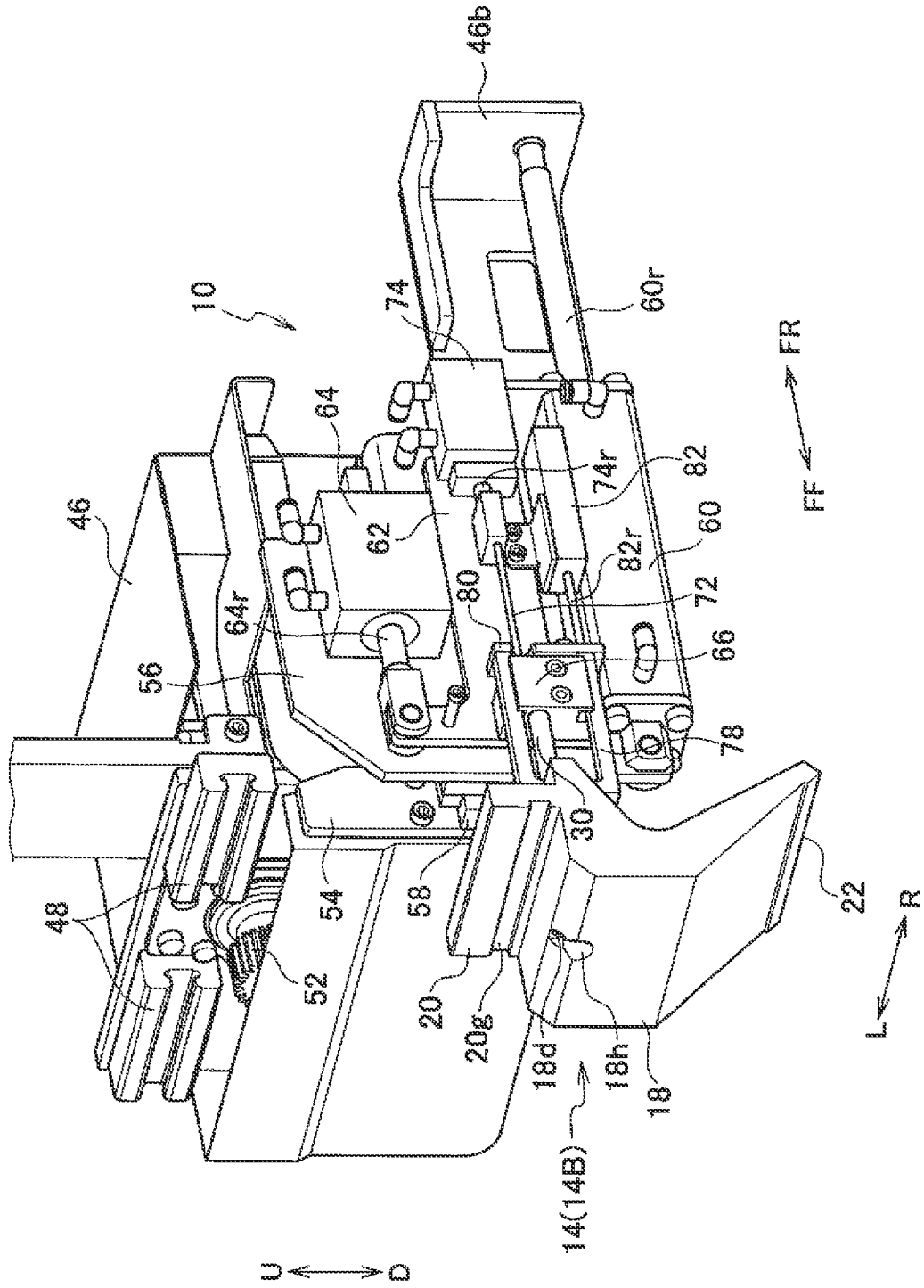
FIG. 3 is a perspective view showing the above goose-neck type upper tool held in the tool changer.

As shown FIG. 1 to FIG. 3, a tool changer 10 according to a first embodiment automatically changes an upper tool tool) 14 for a plurality of upper tool. holders 12 (only one is shown) as tool installation parts of a press brake. The tool changer 10 is disposed on a rear side of (behind) an upper table 16 of the press brake. The plurality of upper tool holders 12 are provided via a space in a right-left direction at a lower end of the upper table 16. Note that a dotted arrow in FIG. 1 only indicates an installation position of the upper tool 14, and does not indicate an installation path of the upper tool 14.

Prior to description of a specific configuration of the tool changer 10, first, description will be made as to a configuration of the upper tool 14.

Figure 4:
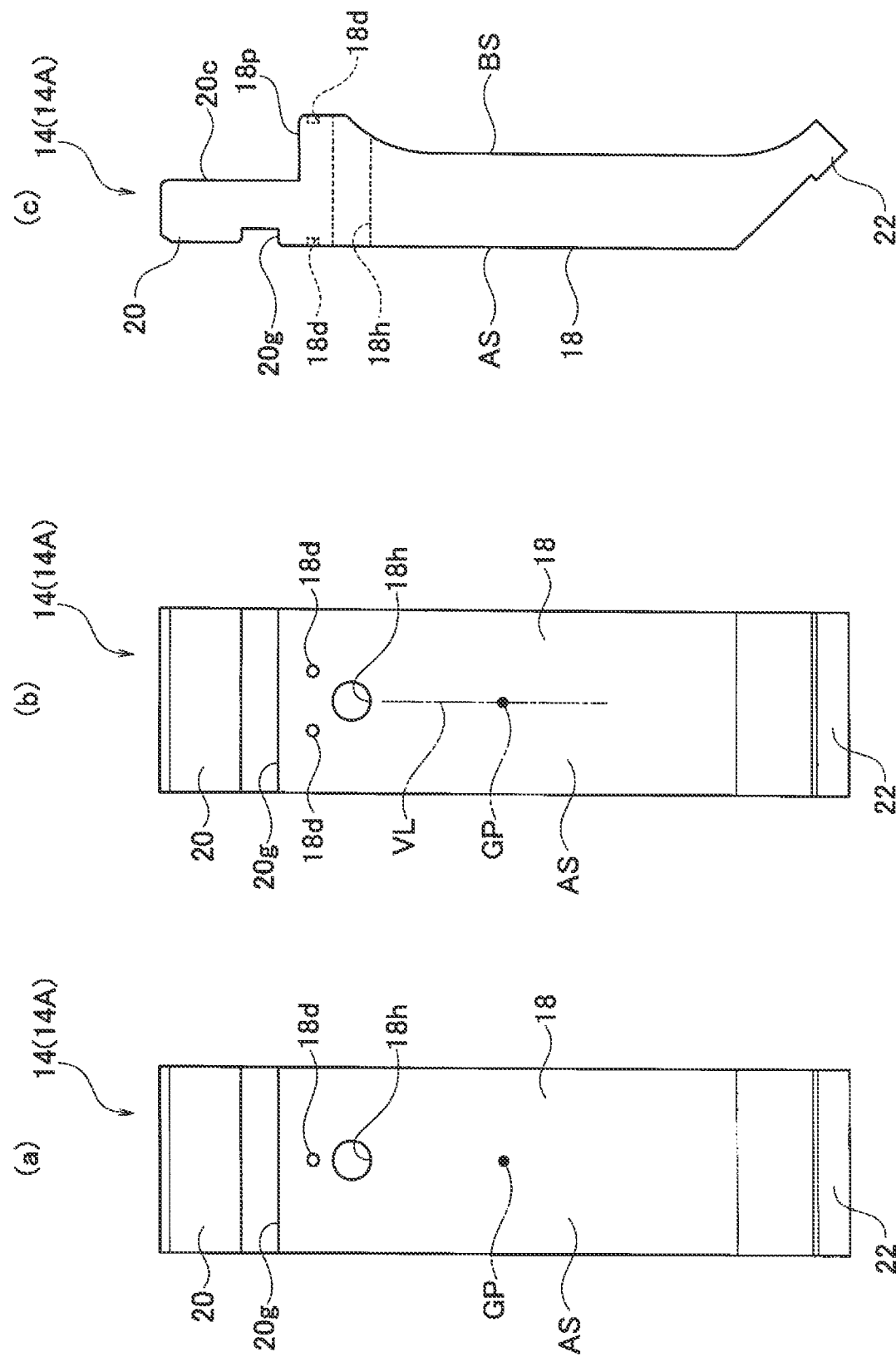
FIG. 4(a) and FIG. 4(b) are front views of the above standard type upper tool.
FIG. 4(c) is a side view of the upper tool.
Figure 5:
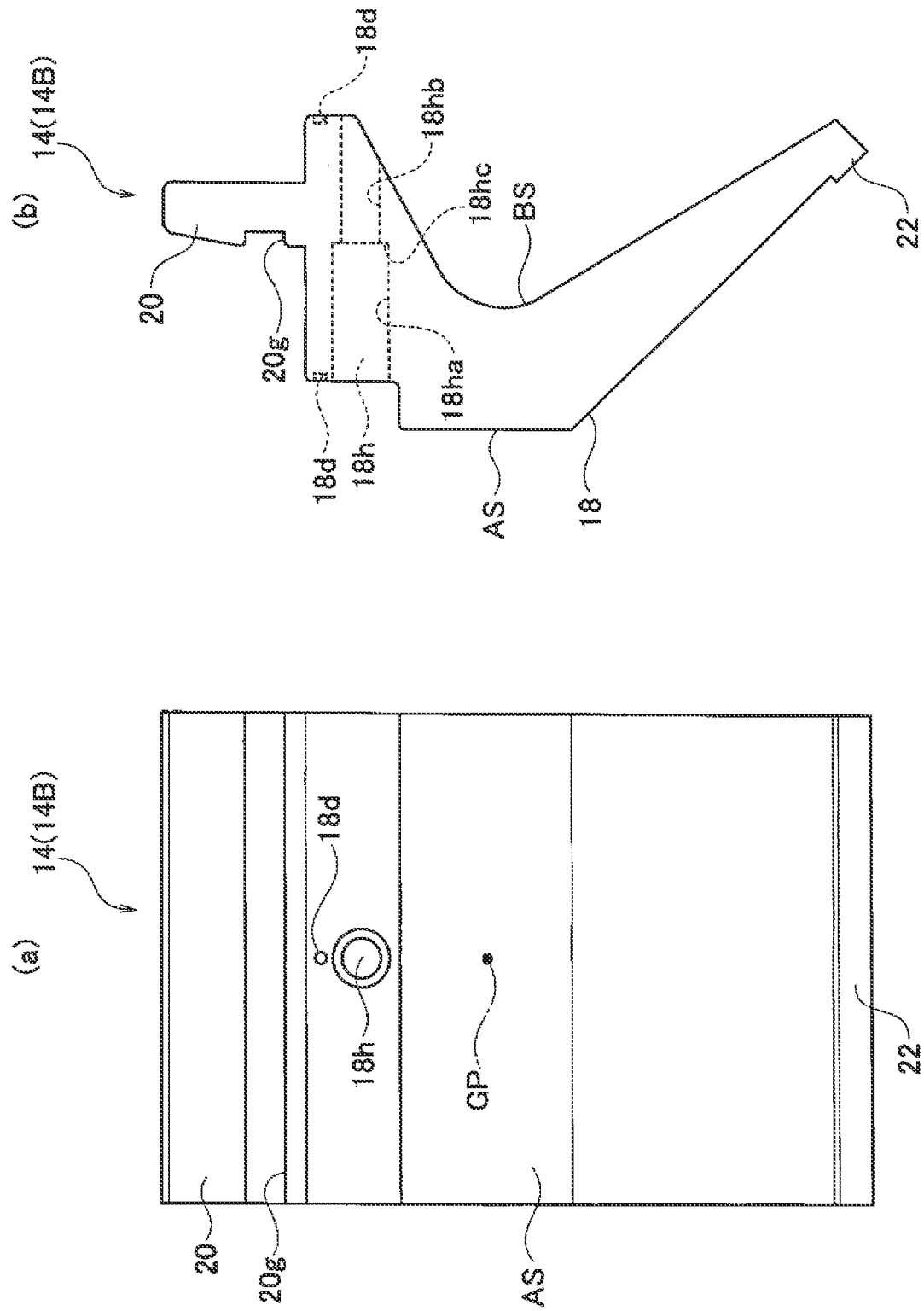
FIG. 5(a) is a front view of the above goose-neck type upper tool.
FIG. 5(b) is a side view of the upper tool.
Figure 6:
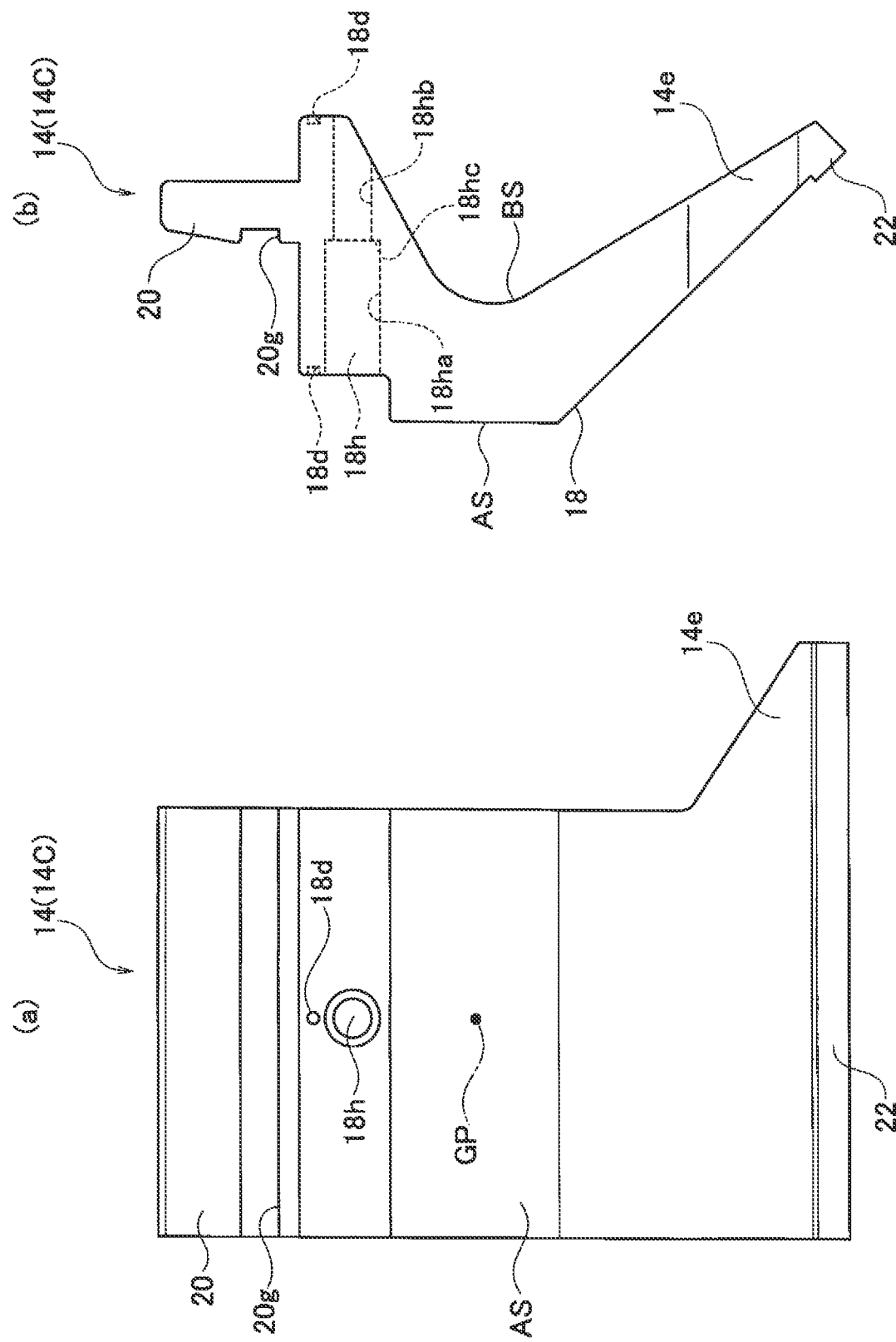
FIG. 6(a) is a front view of the above goose-neck type upper tool (with an expanded portion)
FIG. 6(b) is a side view of the upper tool.

FIG. 4(a) and FIG. 4(b) show a standard type upper tool 14 (14A), and FIG. 5(a) and FIG. 5(b) show a goose-neck type upper tool 14 (14B). FIG. 6(a) and FIG. 6(b) show a goose-neck type upper tool 14 (14C) with an expanded portion. Note that FIG. 4 to FIG. 6 illustrate the upper tool 14, and a target of automatic change of the tool changer 10 is not limited to these upper tools 14.

As shown in FIG. 4 to FIG. 6, the upper tool 14 includes a tool main body 18. On a base end side (an upper end side) of the tool main body 18, an attachment portion 20 to be detachably attached to the upper tool holder 12 by the tool changer 10 is formed. On a tip side (a lower end side) of the tool main body 18, a bending portion 22 to bend a plate-shaped workpiece (not shown) is formed.

As shown in FIG. 1 to FIG. 6, the attachment portion 20 includes a vertical contact surface 20c on a back side thereof. In a state where an anterior surface AS of the upper tool 14 faces forward, the contact surface 20c of the attachment portion 20 comes in contact with a front surface of a holder main body 24 of the upper tool holder 12. In a state where the anterior surface A of the upper tool 14 faces forward, the attachment portion 20 is fixed to the holder main body 24 by a first clamp 26 of the upper tool holder 12. Furthermore, in a state where a back surface BS of the upper tool 14 faces forward due to a turn-over of an orientation of the upper tool 14, the contact surface 20c of the attachment portion 20 comes in contact with a rear surface of the holder main body 24 of the upper tool holder 12. In the state where the back surface BS of the upper tool 14 faces forward, the attachment portion 20 fixed to the holder main body 24 by a second clamp 28 the upper tool holder 12. Furthermore, on a front side of the attachment portion 20, an anti-drop groove 20g is formed along a lateral direction (a direction along a width of the upper tool 14).

A portion of the tool main body 18 which is close to the attachment portion 20 is thicker than another portion of the tool main body 18. The tool main body 18 includes, in an upper part thereof, a pressure receiving face 18p that receives press force (pressurizing force) of the upper table 16. The pressure receiving face 18p of the tool main body 18 is at right angles to the contact surface 20c of the attachment portion 20.

At a correspondent position, in the lateral direction, in the tool main body 18 to a gravity-center position GP (of the upper tool 14), an engagement hole 18h having a circular cross-sectional shape to be engaged with a round-bar shaped finger 30 in the tool changer 10 extends in a thickness direction (a direction along a thickness of the upper tool 14). Note that in a case where the upper tool 14 does not include an expanded portion 14e (see FIG. 6) protruded outwardly in the lateral direction, that is, in a case where the upper tool 14 has a rectangular shape in a front view, the gravity-center position GP in the tool main body 18 is positioned on a center line of the tool main body 18 in the lateral direction. When it is described that "the engagement hole 18h is positioned at the correspondent position, in the lateral direction, to the gravity-center position GP", it is indicated that in the front view, a center of the engagement hole 18h is positioned on a vertical line passing the gravity-center position GP (i.e., a straight line at right angles to a straight line extending in the lateral direction). Note that the cross-sectional shape of the engagement hole 18h is not limited to the circular shape, and may be a polygonal shape such as a square shape.

As shown in FIG. 1 and FIG. 4, in a case where the finger 30 is inserted into the engagement hole 18h from a back surface BS side of the upper tool 14A with the anterior surface AS of the upper tool 14A facing forward, a peripheral edge portion of the engagement hole 18h on a front side is formed as an engaged portion to be engaged with an engagement piece (an engagement member) 32 of the finger 30 (see FIG. 1). In a case where the finger 30 is inserted into the engagement hole 18h from an anterior surface AS side of the upper tool 14A with the back surface ES of the upper tool 14A facing forward due to the turn-over of the orientation of the upper tool 14A, a peripheral edge portion of the engagement hole 18h on a back side is formed as an engaged portion to be engaged with the engagement piece 32 of the finger 30.

As shown in FIG. 2, FIG. 5 and FIG. 6, each of the respective engagement holes 18h of the upper tools 14B and 140 includes a large-diameter portion 18ha on the anterior surface AS side, and includes a small-diameter portion 18hb on the back surface BS side. At an intermediate position of the engagement hole 18h (a boundary between the large-diameter portion 18ha and the small-diameter portion 18hb), a ring-shaped inner stepped portion 18hc is formed. In a case where the finger 30 is inserted into the engagement hole 18h from the back surface BS side of the upper tool 14B or 14C with the anterior surface AS of the upper tool 14B or 14C facing forward, the inner stepped portion 18hc is formed as an engage portion to be engaged with the engagement piece 32 of the finger 30 (see FIG. 2). In a case where the finger 30 is inserted into the engagement hole 18h of the tool main body 18 from the anterior surface AS side of the upper tool 14B or 14C with the back surface PS of the upper tool 14B or 14C facing forward, a peripheral edge portion of the engagement hole 18h on the back side is formed as an engaged portion to be engaged with the engagement piece 32 of the finger 30.

As shown in FIG. 1, FIG. 2 and FIG. 4 to FIG. 7, an anti-rotation depressed portion 18d to be engaged with a tip of a bar-shaped anti-rotation member 34 in the tool changer 10 is formed in a vicinity of the engagement hole 18h on each of opposite surfaces (the anterior surface AS and the back surface BS) of the tool main body 18. The anti-rotation depressed portion 18d is positioned at a correspondent position, in the lateral direction, to the engagement hole 18h and above the engagement hole 18h. If the finger 30 is inserted into the engagement hole 18h, the tip of the anti-rotation member 34 engages with the anti-rotation depressed portion 18d.

As shown in FIG. 4(b), a plurality of anti-rotation depressed portions 18d may be formed in vicinities of the engagement holes 18h on the opposite surfaces of the tool main body 18. In this case, in the front view, the plurality of anti-rotation depressed portions 18d are arranged in a linearly symmetrical manner to a virtual line VL passing the center of the engagement hole 18h in parallel with a vertical direction (a direction along a height of the upper tool 14).

Subsequently, a configuration of the upper tool holder 12 will be briefly described.

As shown in FIG. 1 and FIG. 2, the upper tool holder 12 includes such a known configuration as disclosed in Patent Literature 4, and includes the holder main body 24 at the lower end of the upper table 16 as described above. Furthermore, on a front side of the holder main body 24, the first clamp 26 that is swingable in the front-rear direction to press the attachment portion 20 of the upper tool 14 onto the front surface of the holder main body 24 is provided. On a rear side of the holder main body 24, provided is the second clamp 28 that is swingable in the front-rear direction to press the attachment portion 20 of the upper tool 14 onto a rear surface of the holder main body 24. A pressing operation of the first clamp 26 and the second clamp 28 and an operation of releasing the pressing operation are performed by driving a clamp cylinder 36 provided above the holder main body 24. The first clamp 26 includes, in a lower part thereof, an engagement hook 26c that is engageable in the anti-drop groove 20g of the attachment portion 20. The second clamp 28 includes, in a lower part thereof, an engagement hook 28c that is engageable in the anti-drop groove 20g of the attachment portion 20.

Subsequently, a configuration of the tool changer 10 will be described.

As shown in. FIG. 2 and FIG. 3, the tool changer 10 automatically changes (installs and removes) the upper tool 14 for a plurality of upper tool holders 12 as tool installation parts. The tool changer 10 automatically changes the upper tool 14 for an upper stocker (not shown) in a tool storage (not shown) disposed on a left or right side of the press brake. In other words, the tool changer 10 automatically changes the upper tool 14 between the plurality of upper tool holders 12 and the upper stocker.

Behind (on a back surface side of) the upper table 16, a beam member 38 extending in the right-left direction provided via a plurality of connecting members 40 (only one is shown). The beam member 38 is provided with a rack member 42 extending in the right-left direction. A guide rail 44 extending in the right-left direction is attached to the rack member 42. The guide rail 44 is coupled to a box-shaped first slider 46 that is movable in the right-left direction, via a plurality of linear sliders 48. In other words, the first slider 46 that is movable in the right-left direction along the plurality of upper tool holders 12 is provided behind the upper table 16 via the beam member 38, the guide rail 44 and the like. The first slider 46 includes a bracket 46b in a rear part thereof. At a suitable position of the first slider 46, a servo motor 50 is provided as an actuator that slides the first slider 46 (relative to the upper table 16) in the right-left direction. A pinion gear 52 is fixed to an output shaft of the servo motor 50, and the pinion gear 52 meshes with the rack member 42. Thus, the servo motor 50 is driven, so that the first slider 46 may slide in the right-left direction.

A base plate 54 is attached to a right side of the first slider The base ate 54 is coupled to a second slider 56 that is movable in the front-rear direction, via a guide member 58. At a suitable position or the second slider 56, a hydraulic cylinder 60 is provided as a moving actuator that moves the second slider 56 (relative to the first slider 46 and the base plate 54) in the front-rear direction. A rear end of a piston rod 60r is connected to the bracket 46b of the first slider 46. Thus, the hydraulic cylinder 60 is driven, so that the second slider 56 may slide in the front-rear direction.

The second slider 56 is provided with a third slider 62 that is movable in the front-rear direction, via a guide member (not shown). At a suitable position of the second slider 56, a hydraulic cylinder 64 is provided as an actuator that slides the third slider 62 (relative to the second slider 56) in the front-rear direction. The hydraulic cylinder 64 includes a piston rod 64r that is movable in the front-rear direction, and a tip of the piston rod 64r is coupled to a suitable position of the third slider 62. Thus, the hydraulic cylinder 64 is driven, so that the third slider 62 may move relative to the second slider 56 in the front-rear direction.

In a case where the finger 30 is inserted into the engagement hole 18h from the back surface BS side of the upper tool 14 with the anterior surface AS of the upper tool 14 facing forward, the third slider 62 is brought into a state shown in FIG. 2. On the other hand, in a case where the finger 30 is inserted into the engagement hole 18h from the anterior surface AS side of the upper tool 14 with the back surface BS of the upper tool 14 facing forward, the hydraulic cylinder 64 is driven to move the third slider 62 rearward from the state shown in FIG. 2.

As shown in FIG. 2 and FIG. 7 to FIG. 10, a support block 66 is attached to a front part of the third slider 62. The finger 30 that supports the upper tool 14 protrudes forward from a front surface of the support block 66. In other words, the finger 30 that is movable in the front-rear direction is attached to the first slider 46 via the third slider 62 and the second slider 56. The finger 30 extends in the front-rear direction, and may be inserted into the engagement hole 18h of the upper tool 14. The finger 30 includes a large-diameter portion 30a on a base end side thereof, and includes a small-diameter portion 30b that is insertable into the engagement hole 18h, on a tip side thereof tip (a front end) of the finger 30 is formed in a tapered shape. At an intermediate position of the ringer 30 is boundary between the large-diameter portion 30a and the small-diameter portion 30b, a ring-shaped outer stepped portion 30c that is abuttable on the tool main body 18 is formed.

A slit 30s is formed at a tip of the small-diameter portion 30b of the finger 30. In the slit 30s, the engagement piece 32 as an engagement member that is swingable in an up-down direction is attached via a pivot pin 68. The engagement piece 32 swings in the up-down direction, and is therefore capable of being protruded and retracted relative to an outer peripheral surface of the finger 30. The engagement piece 32 protrudes from the outer peripheral surface of the finger 30, to engage with the peripheral edge portion of the engagement hole 18h or inner stepped portion 18hc of the engagement hole 18h. Note that a stopper 70 that regulates downward swinging of the engagement piece 32 is also provided in the slit 30s of the finger 30.

In finger 30, an operation rod 72 extending in the front-rear direction and movable in the front-rear direction is provided. At a tip (a front end) of the operation rod 72, a cutout 72n is formed, and a tip of the engagement piece 32 is intruded in the cutout 72n. A push face 72na that pushes the engagement piece 32 forward to swing the piece downward is formed at a rear end of the cutout 72n. On the other hand, a pull face 72nb that pulls the engagement piece 32 rearward to swing the piece upward is formed at a front end of the cutout 72n.

At a suitable position of the third slider 62, a hydraulic cylinder 74 is provided as an actuator that swings the engagement piece 32 in the up-down direction. The hydraulic cylinder 74 includes a piston rod 74r that is movable in the front-rear direction, and a tip of the piston rod 74r is coupled to a base end (a rear end) of the operation rod 72. By driving the hydraulic cylinder 74, the operation rod 72 is moved in the front-rear direction, and the engagement piece 32 is swung in the up-down direction to be capable of being protruded and retracted relative to the outer peripheral surface of the finger 30. The tool changer 10 clamps the upper tool 14 between the engagement piece 32 protruded from an outer peripheral surface of a tip portion of the finger 30 and the outer stepped portion 30c of the finger 30.

A configuration where the engagement piece 32 is capable of being protruded and retracted relative to the outer peripheral surface of the finger 30 is no limited to the above described configuration, and any suitable configuration may be employed. For example, a movable pin may be provided in a tip portion of the operation rod 72, and the pin may be engaged in a slot formed in the engagement piece 32, so that according to this structure, the engagement piece 32 is capable of being protruded and retracted relative to the outer peripheral surface of the finger 30. Alternatively, the operation rod 72 may be provided with a cam or wedge member, and the cam or wedge member may be brought into contact with the engagement piece 32, so that according to this structure, the engagement piece 32 is capable of being protruded and retracted relative to the outer peripheral surface of the finger 30. Furthermore, the finger 30 is not limited to the round bar shape, and may be formed in a polygonal-bar shape such as a square bar-shape.

Figure 7:
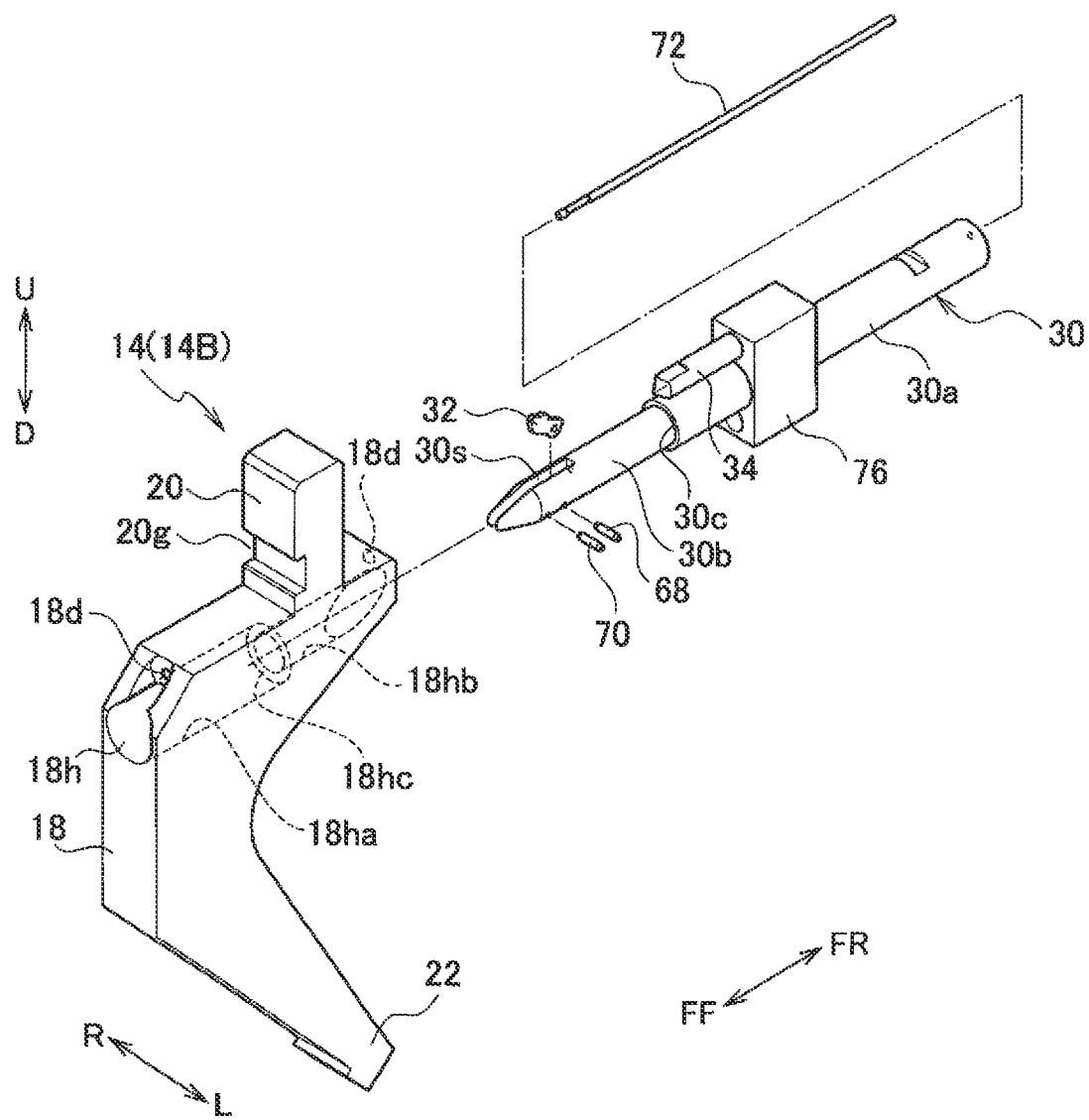
FIG. 7 is an exploded perspective view showing a relation between a peripheral configuration of a finger, including an anti-rotation member, and the upper tool.
Figure 8:
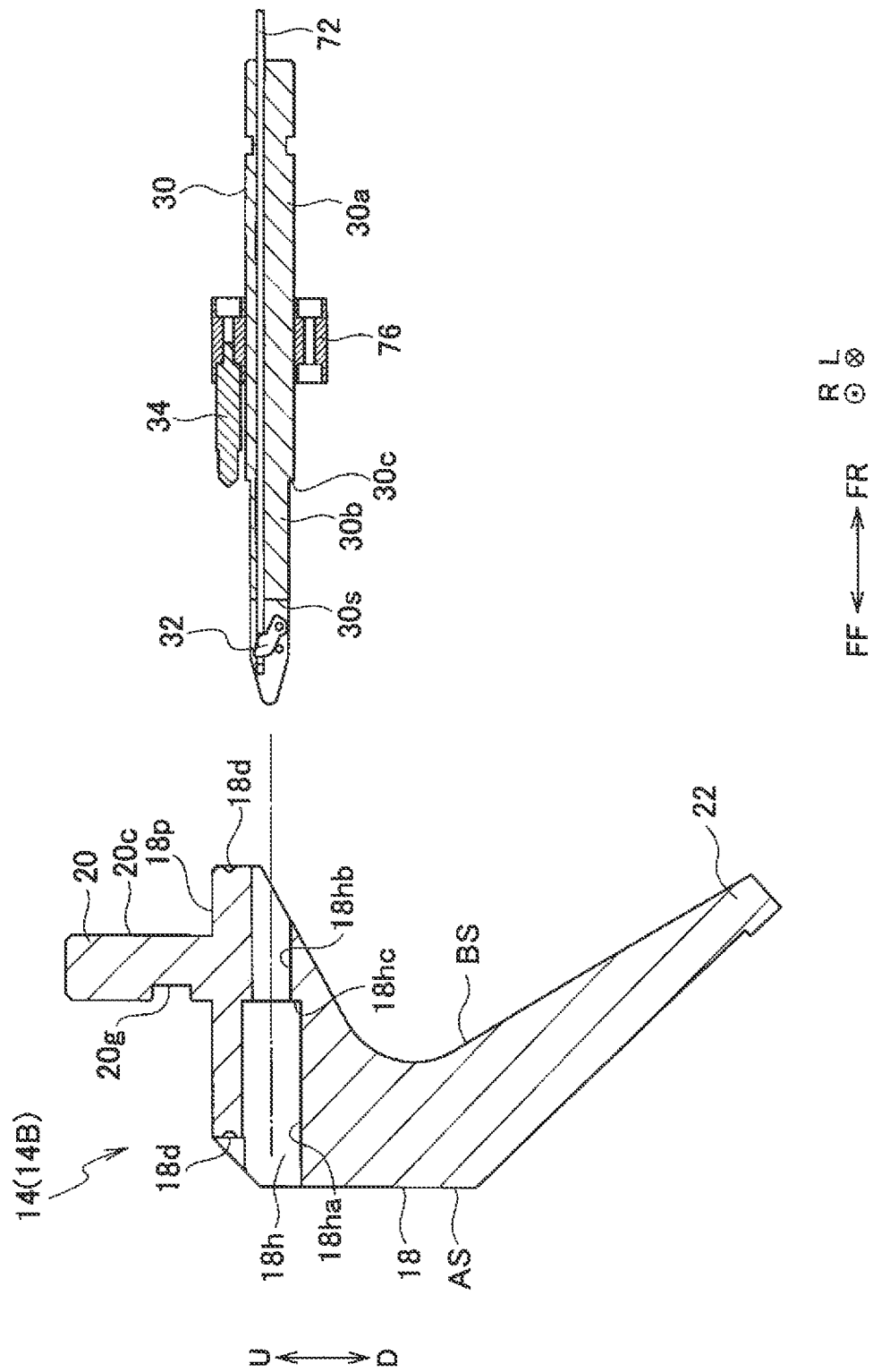
FIG. 8 is a side cross-sectional view showing a relation between the peripheral configuration of the finger, including the anti-rotation member, and the upper tool.

As shown in FIG. 1, FIG. 2, FIG. 7 and FIG. 8, the large-diameter portion 30a of the finger 30 is provided with a slide block 76 that is slidable relative to the finger 30 in the front-rear direction. The sliding of the slide block 76 is guided by the finger 30 (the large-diameter portion 30a). In the support block 66 described above, a pair of slide rods 78 that are slidable (relative to the support block 66) in the front-rear direction are supported. The slide block 76 is coupled integrally to tips (front ends) of the pair of slide rods 78, and a connecting member 80 coupled to base ends (rear ends) of the pair of slide rods 78. Note that the slide block 76 shown in FIG. 7 and FIG. 8 is different in shape from the slide block 76 shown in FIG. 1 and FIG. 2, but has the same function (schematically shown in. FIG. 7 and FIG. 8).

The anti-rotation member 34 that prevents rotation of the upper tool 14 supported by the finger 30 as described above is attached to a front surface of the slide block 76. In other words, the anti-rotation member 34 that is movable in the front-rear direction is provided, via the slide block 76, in the large-diameter portion 30a of the finger 30. The tapered tip of the anti-rotation member 34 may be engaged in the anti-rotation depressed portion 18d of the upper tool 14. The anti-rotation member 34 presses the upper tool 14 toward the engagement piece 32 protruded from the outer peripheral surface of the finger 30. That is, the anti-rotation member 34 cooperates with the engagement piece 32 protruded from the outer peripheral surface of the finger 30 to clamp the upper tool 14. The third slider 62 is provided with a hydraulic cylinder 82 as an actuator that moves the anti-rotation member 34 (relative to the third slider 62) in the front-rear direction. The hydraulic cylinder 82 includes a piston rod 82r that is movable in the front-rear direction, and a tip of the piston rod 82r is coupled to the connecting member 80. Thus, the hydraulic cylinder 82 is driven, so that the anti-rotation member 34 may be moved integrally with the slide block 76 in the front-rear direction to be engaged in and disengaged from the anti-rotation depressed portion 18d.

Figure 11:
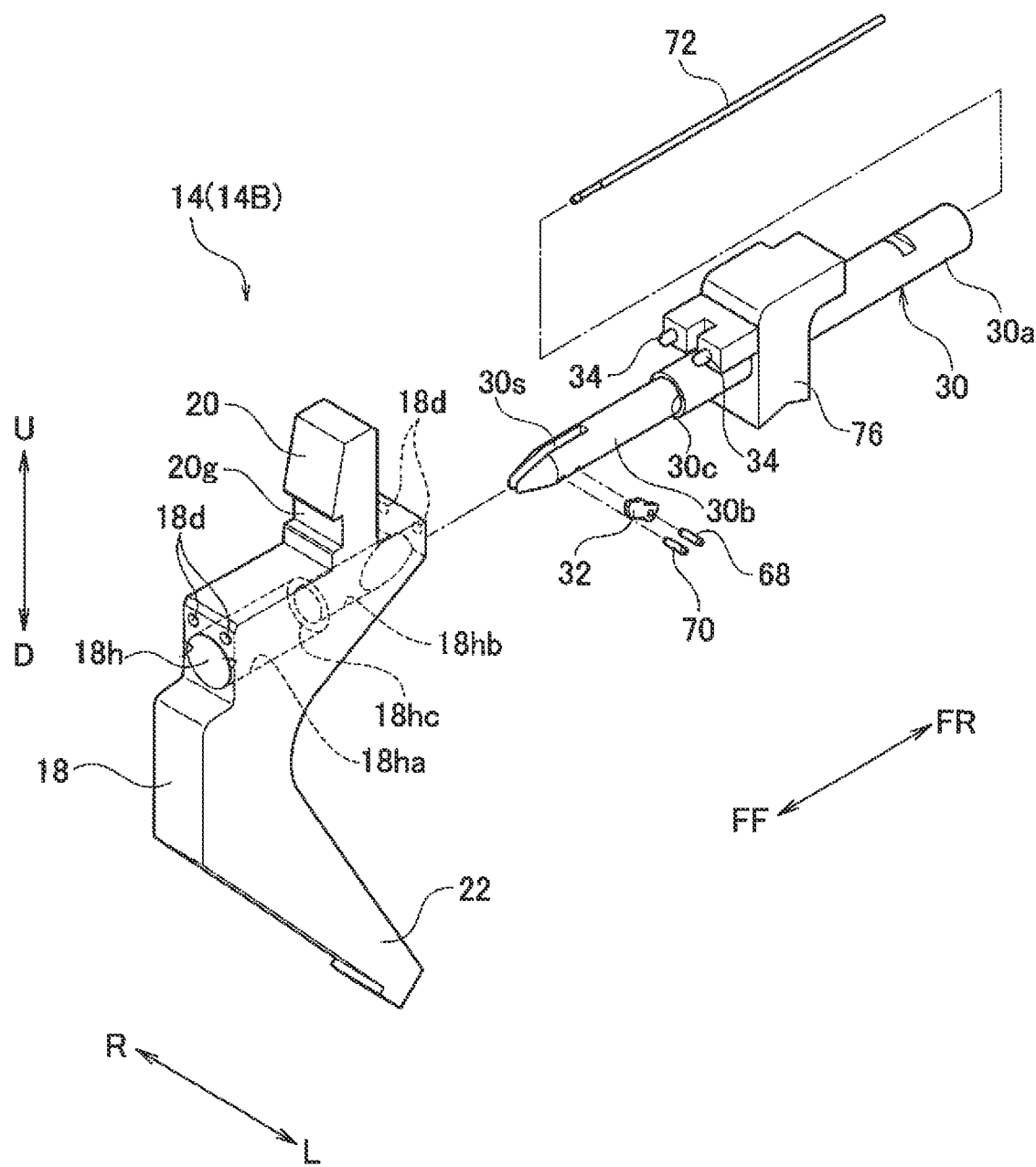
FIG. 11 is an exploded perspective view showing a relation between the peripheral configuration of the finger, including a plurality of anti-rotation members, and the upper tool.

In a case where the plurality of anti-rotation depressed portions 18d are formed in the vicinities of the engagement holes 18h on the opposite surfaces of the tool main body 18 (see FIG. 4(b)), as shown in FIG. 11, a plurality of anti-rotation members 34 are protruded from the front surface of the slide block 76. The plurality of anti-rotation members 34 are arranged in a linearly symmetrical manner to a virtual vertical line passing an axial center of the finger 30 (a center line in the up-down direction).

Note that in a case where a cross-sectional shape of the engagement hole 18h (see FIG. 7) is polygonal, and a cross-sectional shape of the small-diameter portion 30b of the finger 30 (see FIG. 7) is also a polygonal shape corresponding to the cross-sectional shape of the engagement hole 18h, the anti-rotation member 34 can be omitted. That the finger 30 may function as an anti-rotation member.

Subsequently advantages of the first embodiment will be described.

Upon releasing the pressing of the attachment portion 20 with the first clamp 26 and the second clamp 28 (the upper tool 14 does not drop down), the first slider 46 is moved in the right-left direction, and the finger 30 is opposed to the engagement hole 18h. Next, the second slider 56 moves forward to insert the finger 30 into the engagement hole 18h. The outer stepped portion 30c of the finger 30 abuts on the peripheral edge portion of the engagement hole 18h. The engagement piece 32 protrudes from the outer peripheral surface of the finger 30, to engage with the peripheral edge portion of the engagement hole 18h or the inner stepped portion 18hc of the engagement hole 18h. Consequently, the upper tool 14 is clamped between the engagement piece 32 and the outer stepped portion 30c of the finger 30. Next, the anti-rotation member 34 is moved forward integrally with the slide block 76, and the of the anti-rotation member 34 engages in the anti-rotation depressed portion 18d. As a result, the upper tool 14 is supported by the finger 30 in a non-rotatable state to finger 30. Then, the first slider 46 is moved to the right (or to the left), so that the upper tool 14 is removed from, the upper tool holder 12 (the upper table 16) while keeping a vertical posture.

If the width of the upper tool 14 is smaller than a space between the adjacent upper tool holders 12, the following operation may be performed. The upper tool 14 is supported by the finger 30, and then the first slider 46 is moved in the right-left direction, to once stop upper tool 14 between the adjacent upper tool holders 12. Then, the second slider 56 is moved rearward, so that the upper tool 14 is removed from the upper tool holder 12 (the upper table 16) while keeping the vertical posture.

In a case where the upper tool 14 is installed to the upper tool holder 12, an operation reverse to the above operation is performed. In this way, the upper tool 14 can be automatically changed (installed and removed) for the upper tool holder 12.

Also, in a case where the upper tool 14 is automatically changed for the upper stocker of the tool storage, a similar operation is performed. Consequently, the upper tool 14 can be automatically changed between the plurality of upper tool holders 12 and the upper stocker.

As described above, the finger 30 is insertable into the engagement hole 18h of the upper tool 14, and the engagement piece 32 is capable of being protruded and retracted relative to the tip-side outer peripheral surface of the finger 30. Furthermore, the tool changer 10 includes the anti-rotation member 34 that prevents the rotation of the upper tool 14 supported by the finger 30. Consequently, in the state where the finger 30 is inserted into the engagement hole 18h of the upper tool 14 to engage the engagement piece 32 with the peripheral edge portion of the engagement hole 18h or the inner stepped portion 18hc of the engagement hole 18h, the tip of the anti-rotation member 34 is engageable in the anti-rotation depressed portion. 18d. As a result, the posture of the upper tool 14 to the finger 30 can be stabilized while inhibiting the rotation of the upper tool 14. In particular, the plurality of anti-rotation members 34 are arranged in a linearly symmetrical manner to the above described virtual vertical line, so that inclination of the upper tool 14 due to resistance (inertia) during the movement of the upper tool 14 in the right-left direction can be suppressed, and the posture of the upper tool 14 can be further stabilized. According to the tool changer 10, even if the upper tool 14 is not provided with a member corresponding to an operation member extending in the vertical direction (the direction along the height of the upper tool 14) (see Patent Literatures 1 and 2) or an elongated hole, the upper tool 14 cart be automatically changed for the plurality of upper tool holders 12 of the press brake by the tool changer 10.

Therefore, according to the first embodiment, the height of the upper tool 14 to be automatically changed is set to about the same as a height of a usual upper tool (not shown), and the usual upper tool is post-processed. Consequently, the tool can be used as the upper tool 14 to be automatically changed. Furthermore, difficulty in production of the upper tool 14 to be automatically changed is eliminated, while production time for the upper tool 14 to be automatically changed can be shortened. That is, the upper tool 14 of the first embodiment is easy to be produced (can be produced by modifying the existing tool) and is suitable for the automatic change. Then, according to the tool changer 10 of the first embodiment, the tool that is easy to produce can be suitably changed automatically.

Furthermore, the tool changer 10 is configured to clamp the upper tool 14 between the engagement piece 32 protruded from the outer peripheral surface of the finger 30 on the tip side and the outer stepped portion 30c of the finger au. Consequently, the upper tool 14 may be supported by the finger 30, in the state of keeping the vertical posture. As a result, when the upper tool 14 is installed to the upper tool holder 12, wear on the upper tool 14 due to rubbing with the first clamp 26 or the like can be decreased.

Modification of First Embodiment

As shown in FIG. 12, the small-diameter portion 30b of the finger 30 may be provided with an elastic tube 84 such as a rubber tube. In this case, after the small. diameter portion 30b is inserted into the engagement hole 18h, air is supplied through an air supply passage 30p to expand the elastic tube 84. The rotation of the upper tool 14 is prevented by using friction between an outer peripheral surface of the expanded elastic tube 84 and an inner peripheral surface of the engagement hole 18h.

Figure 13:
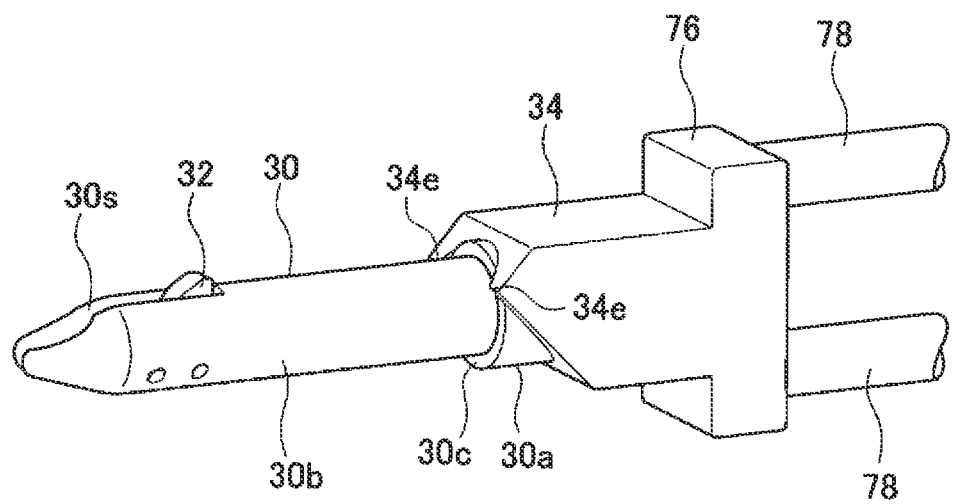
FIG. 13 is a perspective view showing an anti-rotation member including a plurality of edges.
Figure 14:
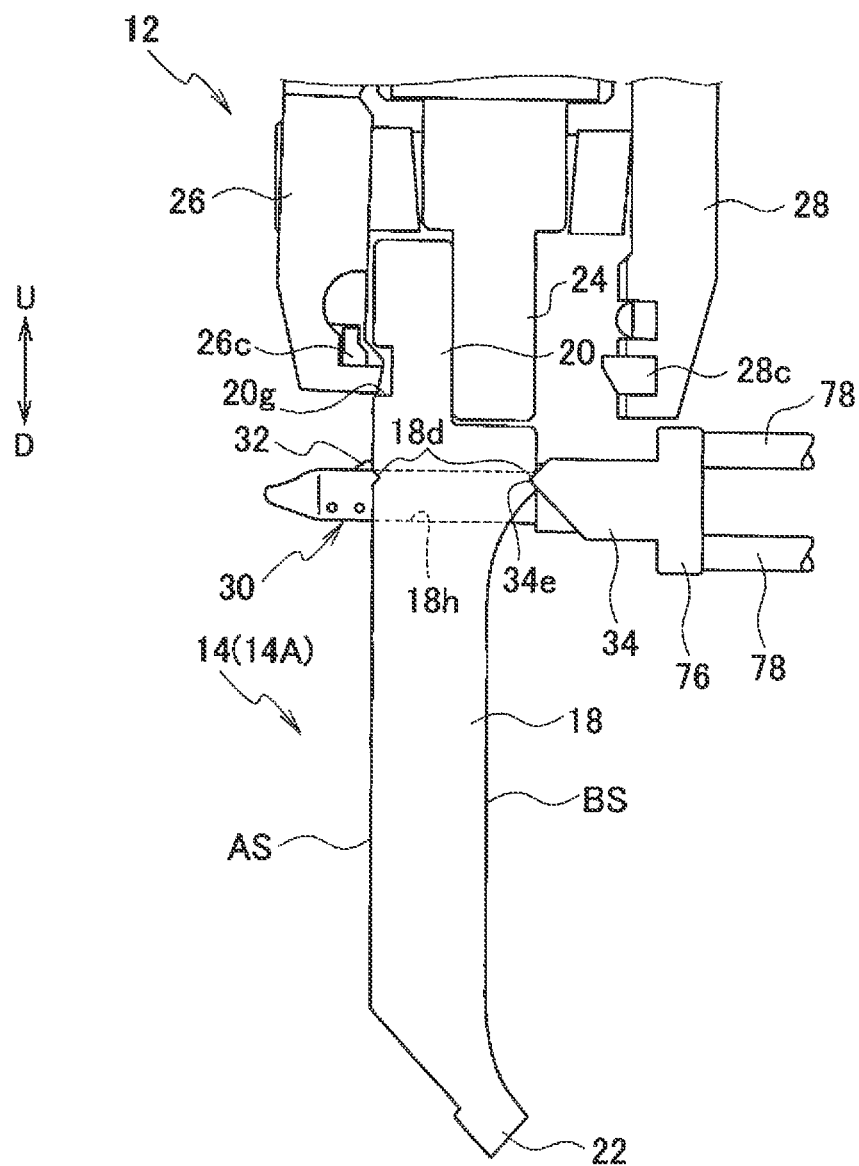
FIG. 14 is a side view showing a behavior that the edge of the anti-rotation member is engaged in an anti-rotation depressed portion of a tool main body.

As shown in FIG. 13 and FIG. 14, a plurality of sharp edges 34e may be formed in the anti-rotation member 34. In this case, the corresponding anti-rotation depressed portion 18d of the upper tool 14 is pressed with the sharp edges 34e, thereby preventing the rotation of the upper tool 14.

Figure 15:
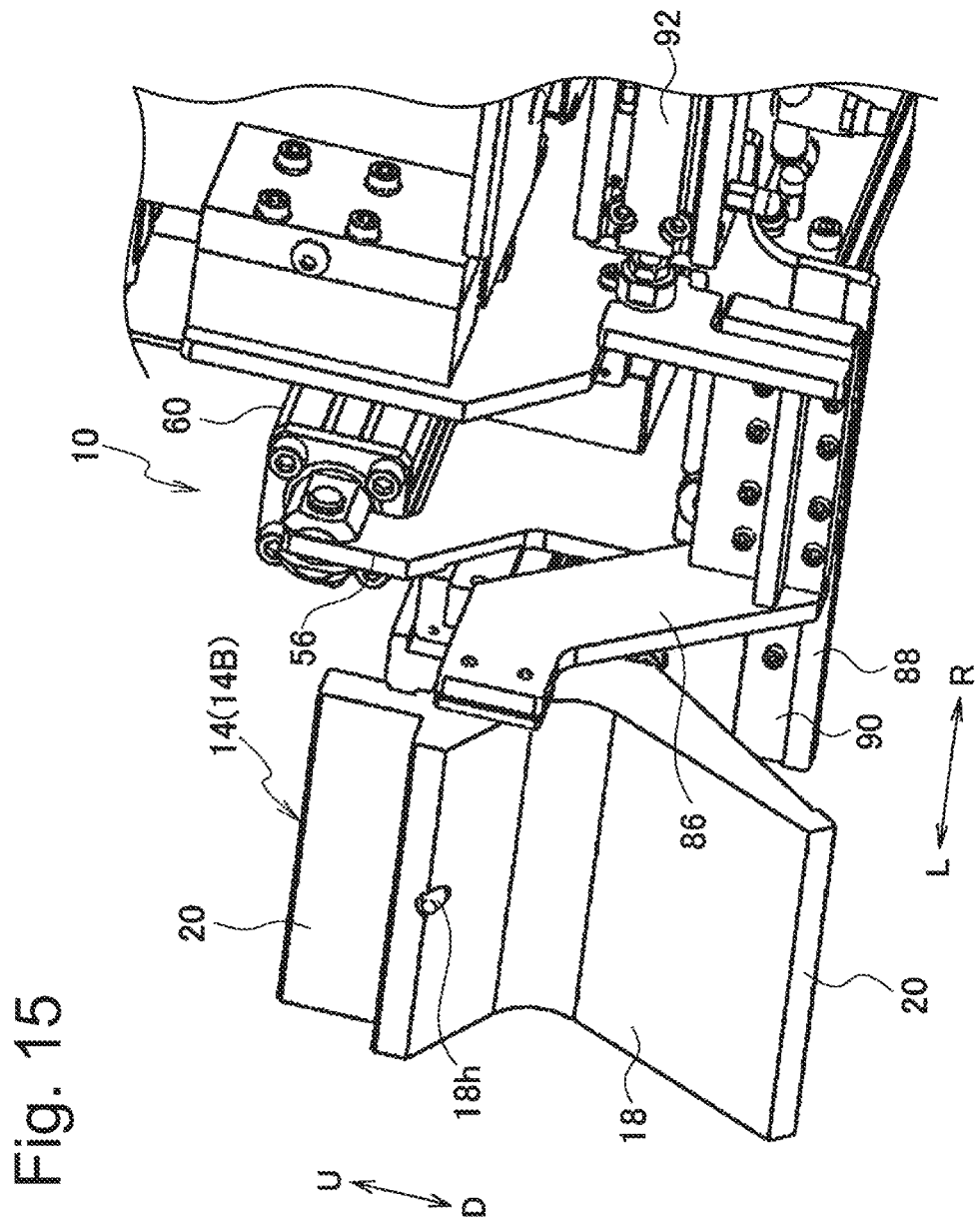
FIG. 15 is a perspective view showing a state where the anti-rotation member is in contact with the upper tool supported by the finger from a side.

As shown in FIG. 15, a flat-plate shaped anti-rotation member 86 may come in contact with a side surface of the upper tool 14 supported by the finger 30 from one side (a right side) in the right-left direction.

Figure 16:
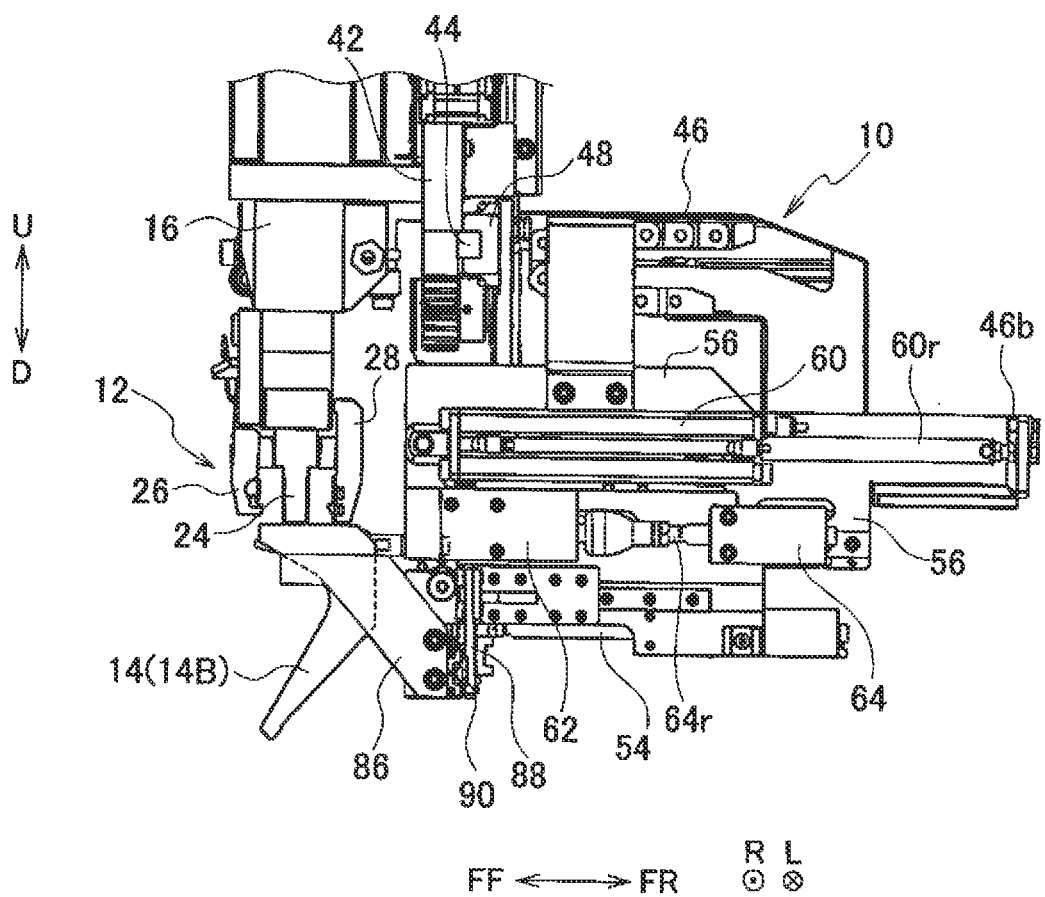
FIG. 16 is a side view of the tool changer including the anti-rotation member that is contactable with the upper tool from the side.

Specifically, as shown in FIG. 15 and FIG. 16, the second slider 56 is provided with a movable bracket 88 that is movable in the front-rear direction. At a suitable position of the second slider 56, a hydraulic cylinder (not shown) is provided as an actuator that moves the movable bracket 88 in the front-rear direction. Furthermore, the movable bracket 88 is provided with a guide rail 90 extending in the right-left direction. The anti-rotation member 86 is movably attached to the guide rail 90. At a suitable position of the movable bracket 88, a hydraulic cylinder 92 is provided as an actuator that moves the anti-rotation member 86 in the right-left direction.

The hydraulic cylinder is driven to move the movable bracket 88 forward, and the anti-rotation member 86 is opposed to the side surface of the upper tool 14 supported bar the finger 30. Then, the hydraulic cylinder 92 is driven to move the anti-rotation member 86 to the left, and the anti-rotation member 86 comes in contact with the side surface of the upper tool 14 from one side (the right side) in the right-left direction. Consequently, the upper tool 14 becomes non-rotatable to the finger 30.

Figure 17:
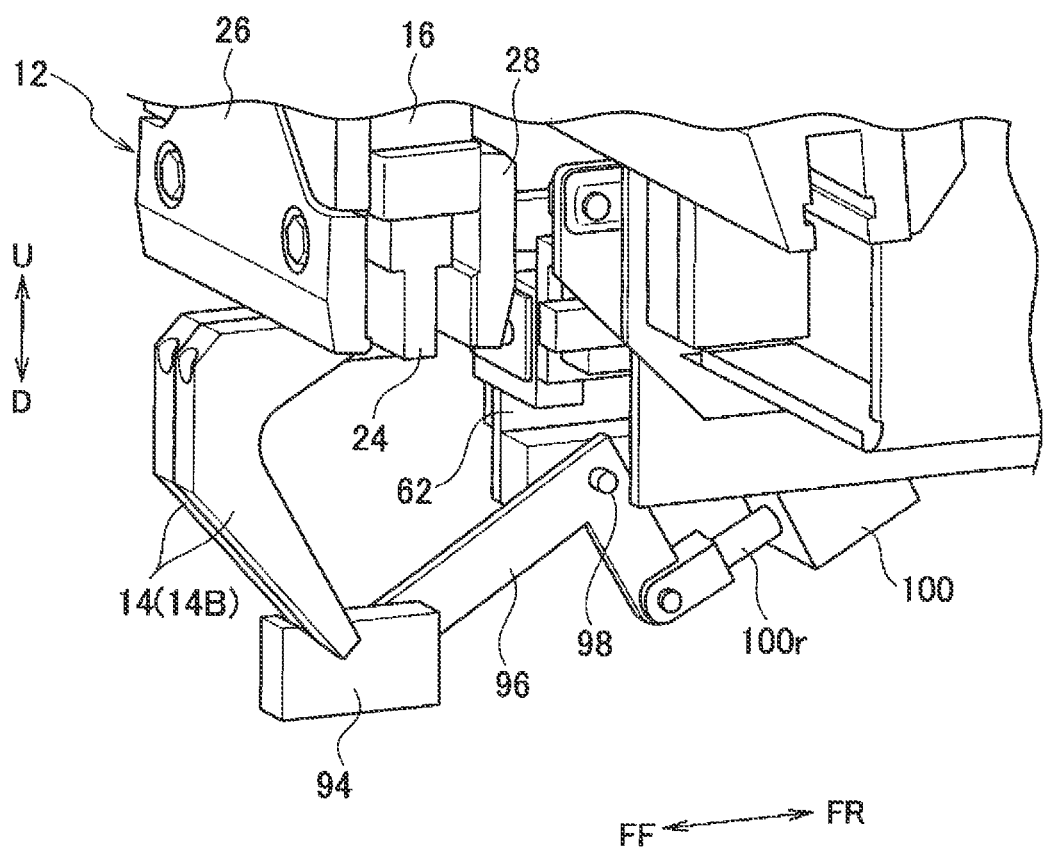
FIG. 17 is a perspective view showing a state where the anti-rotation member is in contact with a tip of the upper tool supported by the finger.

As shown in FIG. 17, a flat-plate shaped anti-rotation member 94 may come, from below, in contact with a tip (a lower end) of the upper tool 14 supported by the finger 30.

Figure 18:
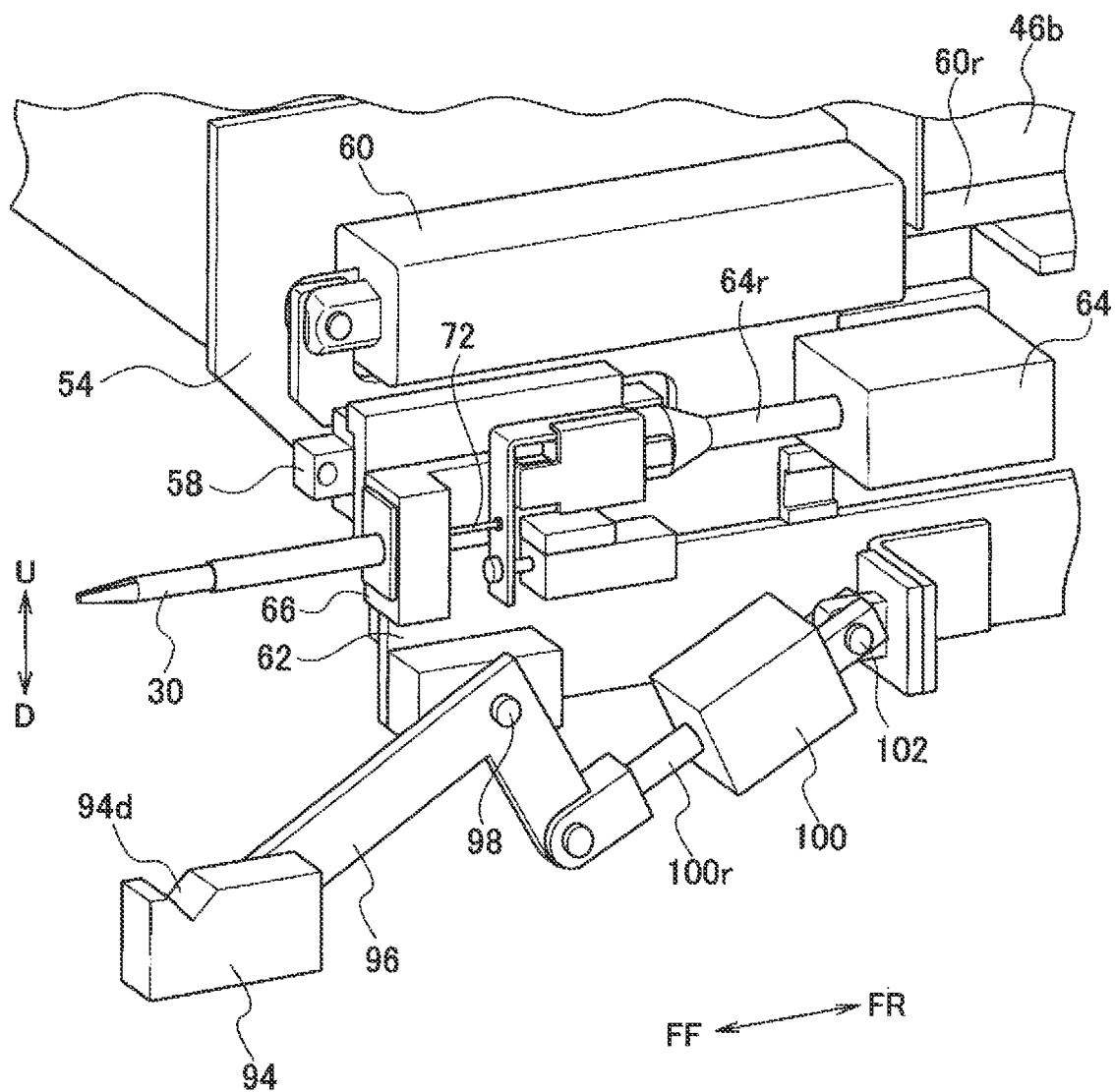
FIG. 18 is a perspective view showing a peripheral configuration of the anti-rotation member that is contactable with the tip of the upper tool.

Specifically, as shown in FIG. 17 and FIG. 18, a bell-crank shaped swing arm 96 that is swingable in the up-down direction is attached to the third slider 62 via a pivot pin 98. At a suitable position of the third slider 62, a hydraulic cylinder 100 is provided as an actuator that swings the swing arm 96 in the up-down direction, via a pivot pin 102. The hydraulic cylinder 100 includes a strokable piston rod 100r, and a tip of the piston rod 100r is coupled to a base end (one end) of the swing arm 96. The anti-rotation member 94 is fixed to a tip (the other end) of the swing arm 96. In the anti-rotation member 94, an engagement notch 94d that is engageable with the tip of the upper tool 14, i.e., the bending portion 22 is formed.

In a state where the anti-rotation member 94 is positioned in a vicinity of the upper tool 14 supported by the finger 30, the hydraulic cylinder 100 is driven to swing the tip of the swing arm 96 upward. The engagement notch 94d of the anti-rotation member 94 comes in contact (engages) with the tip of the upper tool 14 from below. Consequently, the upper tool 14 becomes non-rotatable to the finger 30.

Second Embodiment

Figure 19:
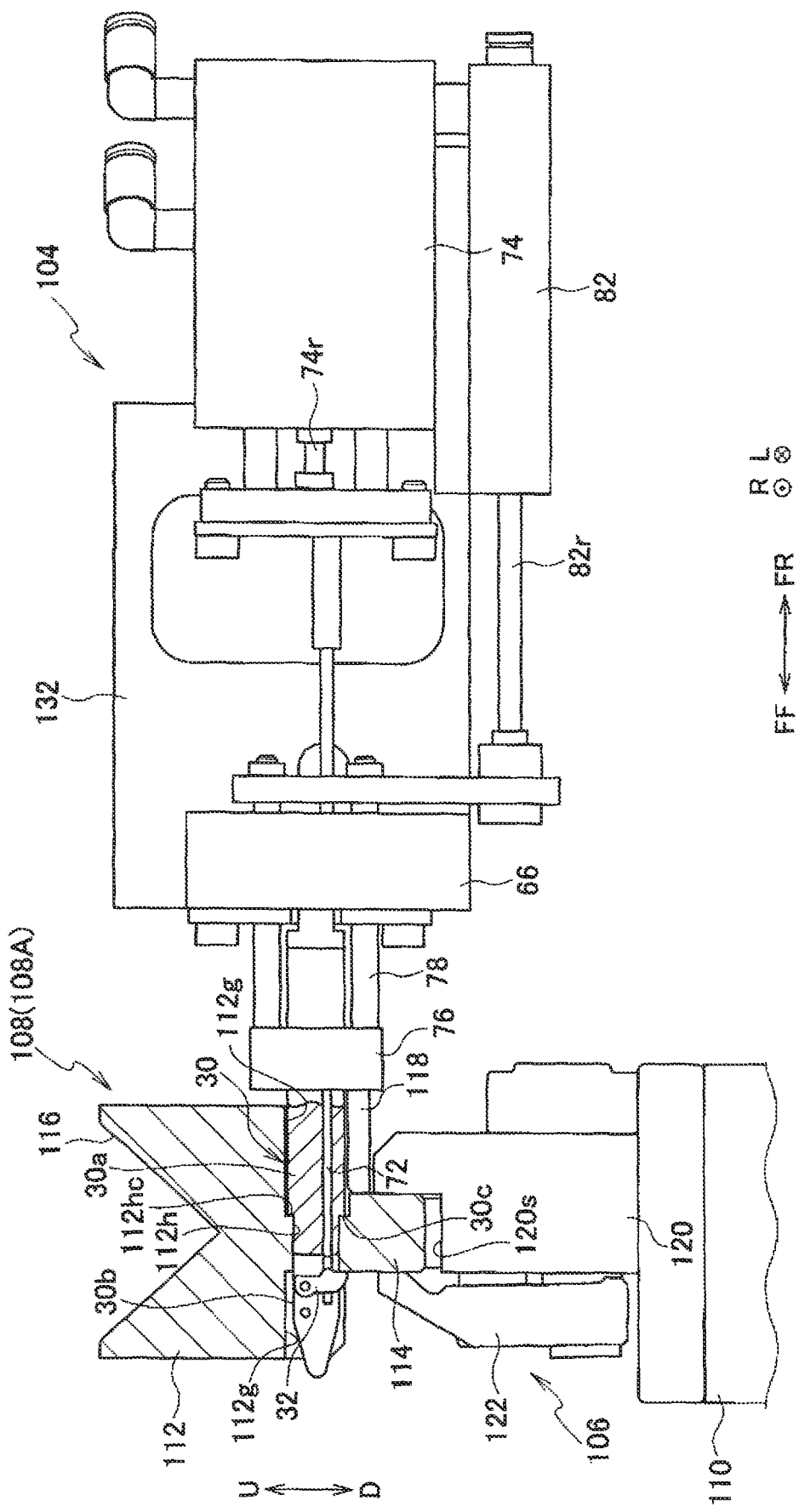
FIG. 19 is a side view (partially cross sectional) showing a lower tool (a tool main body is thicker than an attachment portion) attached to a lower tool holder of a press brake according to a tool changer of a second embodiment.
Figure 20:
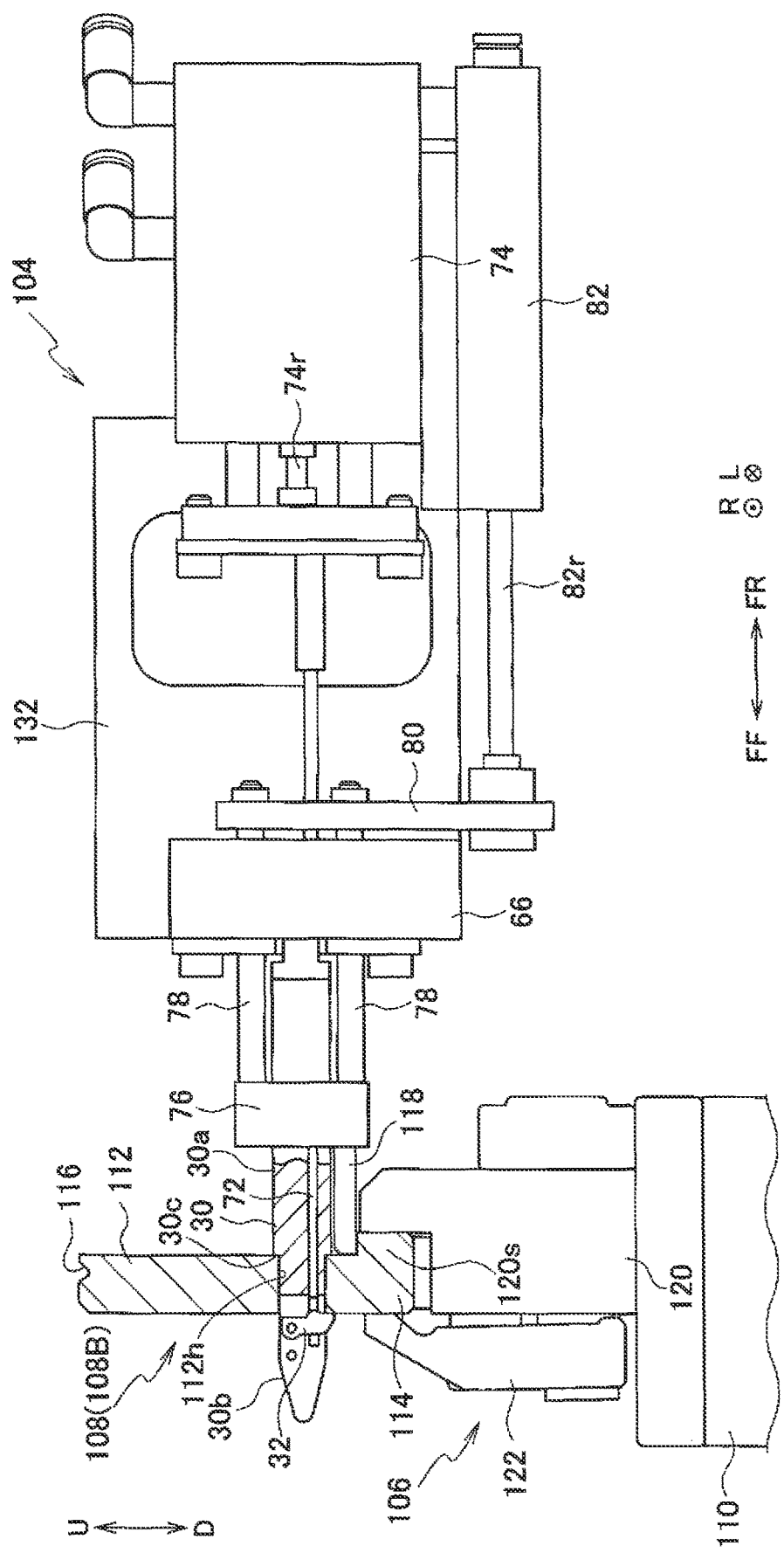
FIG. 20 is a view showing the lower tool (the tool main body is thinner than the attachment portion) attached to the lower tool holder of the press brake according to the tool changer of the second embodiment.
Figure 21:
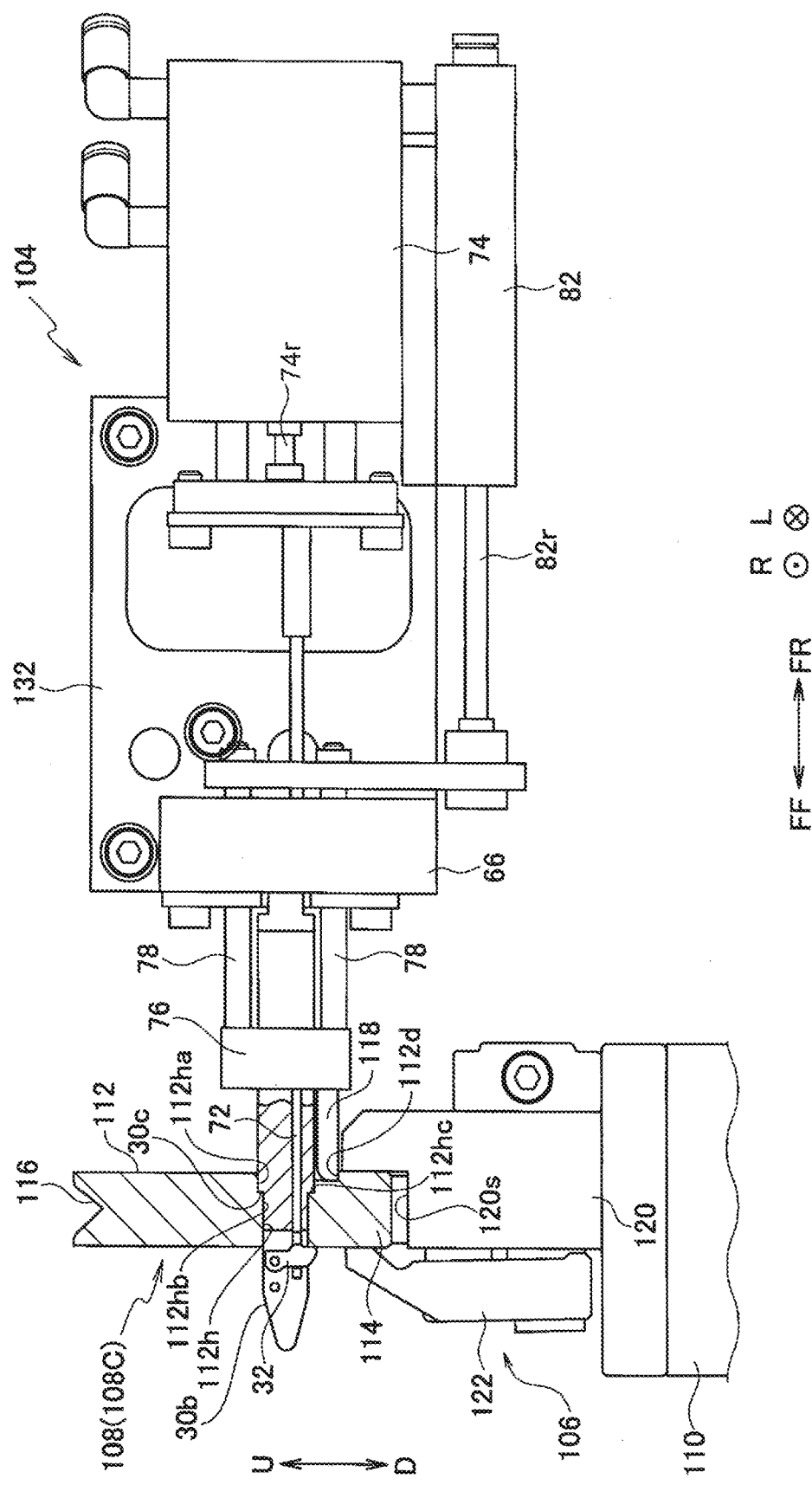
FIG. 21 is a view showing the lower tool (the tool main body and the attachment portion have the same thickness) attached to the lower tool holder of the press brake according to the tool changer of the second embodiment.

As shown in FIG. 19 to FIG. 21, a tool changer 104 according to a second embodiment automatically changes a lower tool (a tool) 108 for a lower tool holder 106 as a tool installation part of a press brake. The tool changer 104 is disposed on a rear side of (behind) a lower table 110 of the press brake. The lower tool holder 106 is provided at an upper end of the lower table 110, and extends in a right-left direction.

Prior to description of a specific configuration of the tool changer 104, first, description will be made as to a configuration of the lower tool 108.

Figure 22:
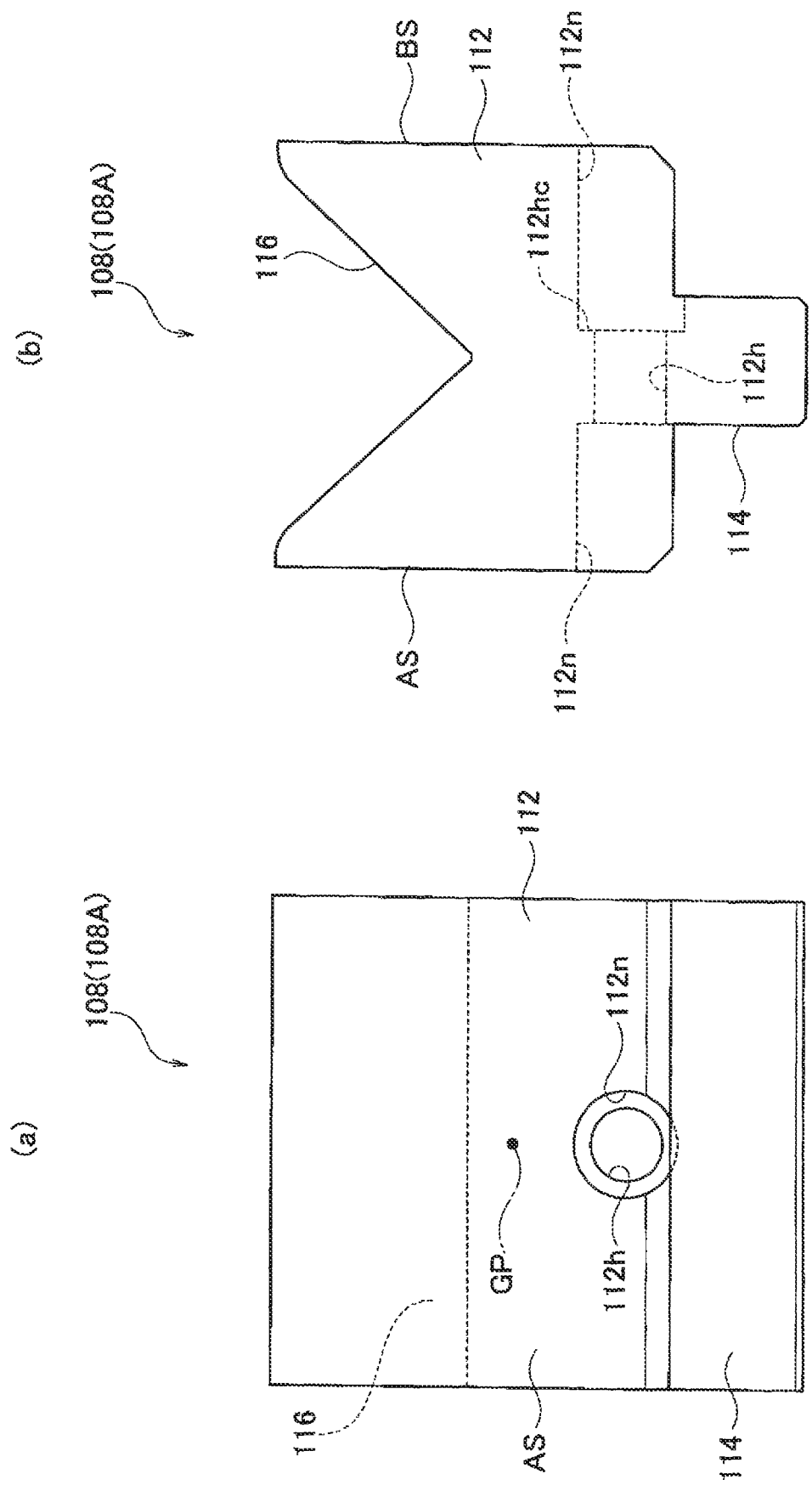
FIG. 22(a) is a front view of the lower tool shown in FIG. 19.
FIG. 22(b) is a side view of the lower tool.
Figure 23:
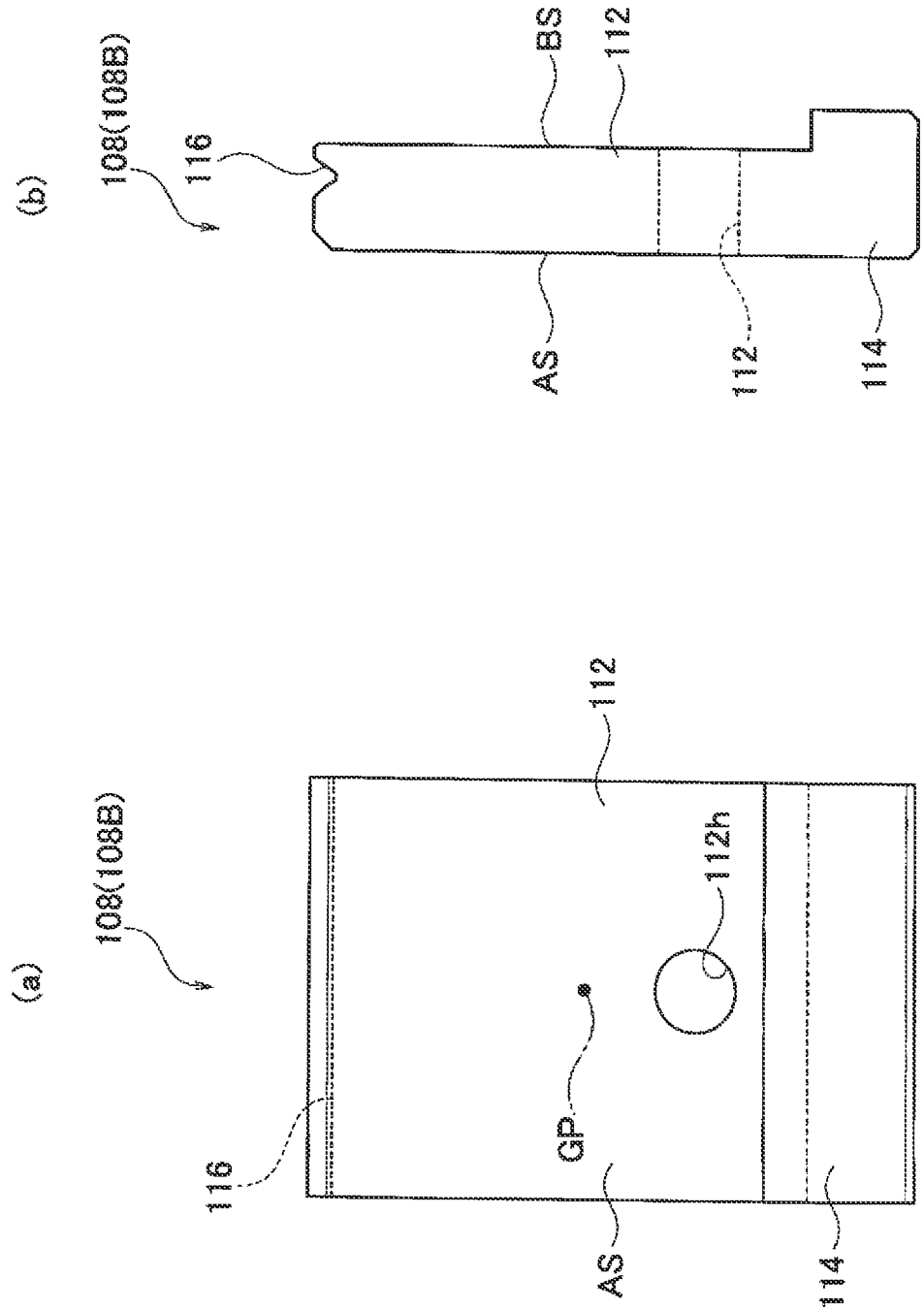
FIG. 23(a) is a front view of the lower tool shown in FIG. 20.
FIG. 23(b) is a side view of the lower tool.
Figure 24:
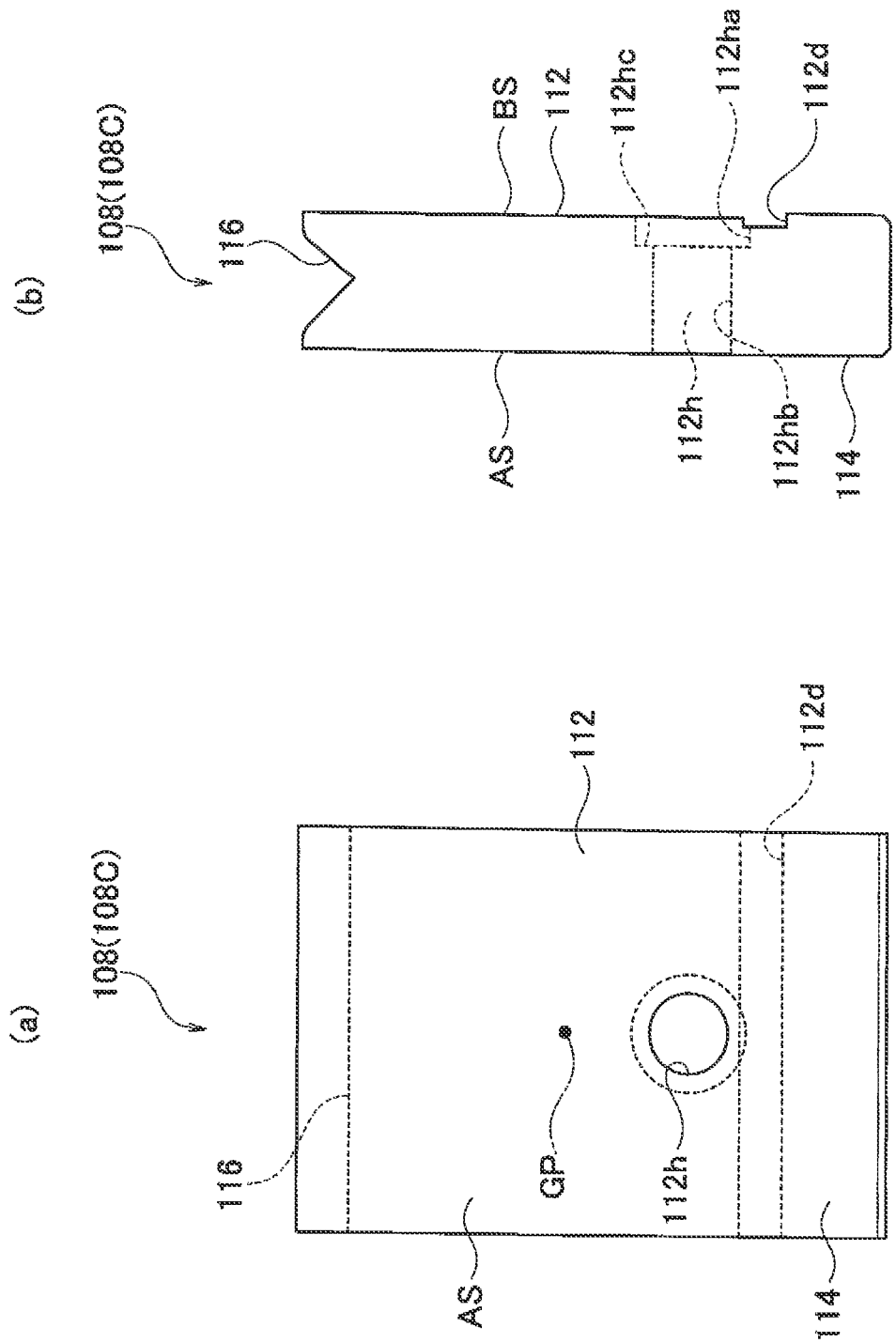
FIG. 24(a) is a front view of the lower tool shown in FIG. 21.
FIG. 24(b) is a side view of the lower tool.

As shown in FIG. 22 to FIG. 24, the lower tool 108 includes a tool main body 112. On a base end side (a lower end side) of the tool main body 112, an attachment portion 114 to be detachably attached to the lower tool holder 106 by the tool changer 104 is formed. On a tip side (an upper end side) of the tool main body 112, a bending portion 116 to bend a plate-shaped workpiece (not shown) is formed. Note that the shown bending portion 116 is a V-shaped groove, but may be a U-shaped groove or the like.

FIG. 19 and FIG. 22 show the lower tool 108 (108A) in which the tool main body 112 is thicker than the attachment portion 114, and a lower surface of the tool main body 112 forms a stepped surface. FIG. 20 and FIG. 23 show the lower tool 108 (108B) in which the tool main body 112 is thinner than the attachment portion 114, and an upper surface of the attachment portion 114 forms a stepped surface. FIG. 21 and FIG. 24 show the lower tool 108 (108C) in which the tool main body 112 and the attachment portion. 114 have the same thickness.

As shown in FIG. 19 to FIG. 24, at a correspondent position, in a lateral direction, in the tool main body 112 to a gravity-center position GP (of the lower tool 108), an engagement hole 112h having a circular cross-sectional shape to be engaged with a round-bar shaped finger 30 in the tool changer 104 extends in a thickness direction. Note that the gravity-center position GP in the tool main body 112 is positioned on a center line of the tool main body 112 in the lateral direction. When is described that "the engagement hole 112h is positioned at the correspondent position, in the lateral direction, to the gravity-center position GP", it is indicated that in a front view, a center of the engagement hole 112h is positioned on a vertical line passing the gravity-center position GP (i.e., a straight line at right angles to a straight line extending in the lateral direction).

As shown in FIG. 19 and FIG. 22, cutouts 112n having an arc cross-sectional shape are formed on opposite sides (a front side and a hack side) of the engagement hole 112h of the lower tool 108A, respectively. A radius of each cutout 112n is larger than a radius of the engagement hole 112h. A ring-shaped inner stepped portion 112hc is formed at an intermediate position of the engagement hole 112h.

As shown in FIG. 21 and FIG. 24, the engagement hole 112h of the lower tool 108C includes a large-diameter portion 112ha on a back surface BS side, and includes a small-diameter portion 112hb on an anterior surface AS side. The ring-shaped inner stepped portion 112hc is formed at an intermediate position of the engagement hole 112h (a boundary between the large-diameter portion 112ha and the small-diameter portion 112hb).

As shown in FIG. 19 to FIG. 21, a peripheral edge portion of the engagement hole 112h on the front side is formed as an engaged portion to be engaged with an engagement piece 32 of the finger 30.

As shown in FIG. 19 and FIG. 22, if the finger 30 is inserted into the engagement hole 112h of the lower tool 108A, an upper surface of a flat-plate shaped anti-rotation member 118 comes in surface contact with the lower surface (the stepped surface) of the tool main body 112. As shown in FIG. 20 and FIG. 23, if the finger 30 is inserted into the engagement hole 112h of the lower tool 108B, a lower surface of the flat-plate shaped anti-rotation member 118 comes in surface contact with the upper surface (the stepped surface) of the attachment portion 114. Furthermore, as shown in FIG. 21 and FIG. 24, an anti-rotation depressed portion 112*d* that engages with a tip of the flat-plate shaped anti-rotation member 118 is formed below the engagement hole 112*h* in the tool main body 112 of the lower tool 108C. The anti-rotation depressed portion 112*d* is formed as a straight square groove. If the finger 30 is inserted into the engagement hole 112*h* of the lower tool 108C, the tip of the flat-plate shaped anti-rotation member 118 engages in the anti-rotation depressed portion 112*d*. That is, in any case of the lower tools 108A to 108C, the lower tool 108 is configured to be supported by the finger 30 in a non-rotatable state to the finger 30.

Subsequently, a configuration of the lower tool holder 106 will be briefly described.

As shown in FIG. 19, the lower tool holder 106 includes a known configuration, and includes a holder main body 120 extending in the right-left direction, at the upper end of the lower table 110 as described above. Furthermore, in an upper part of the holder main body 120, a corner portion 120*s* that accommodates the attachment portion 114 of the lower tool 108 is formed. On a front side of the holder main body 120, provided is a clamp 122 that is swingable in a front-rear direction to press the attachment portion 114 of the lower tool 108 onto a rear wall (a rear surface) of the corner portion 120*s* of the holder main body 120. A pressing operation of the clamp 122 and an operation of releasing the pressing operation are performed by driving a clamp cylinder (not shown) provided in the holder main body 120.

Subsequently, description will be made as to components of the tool changer 104 which are different from components of the tool changer 10 (see FIG. 2) in the first embodiment. Note that the component that is the same as or equivalent to the component of the tool changer 10 in the first embodiment is denoted with the same reference sign.

As shown in FIG. 19 to FIG. 21, the tool changer 104 automatically changes (installs and removes) the lower tool 108 for the lower tool holder 106 as a tool installation part. The tool changer 104 automatically changes the lower tool 108 for a lower stocker (not shown) in a tool storage (not shown) disposed on a side of the press brake in the right-left direction. In other words, the tool changer 104 automatically changes the lower tool 108 between the lower tool holder 106 and the lower stocker.

Figure 25:
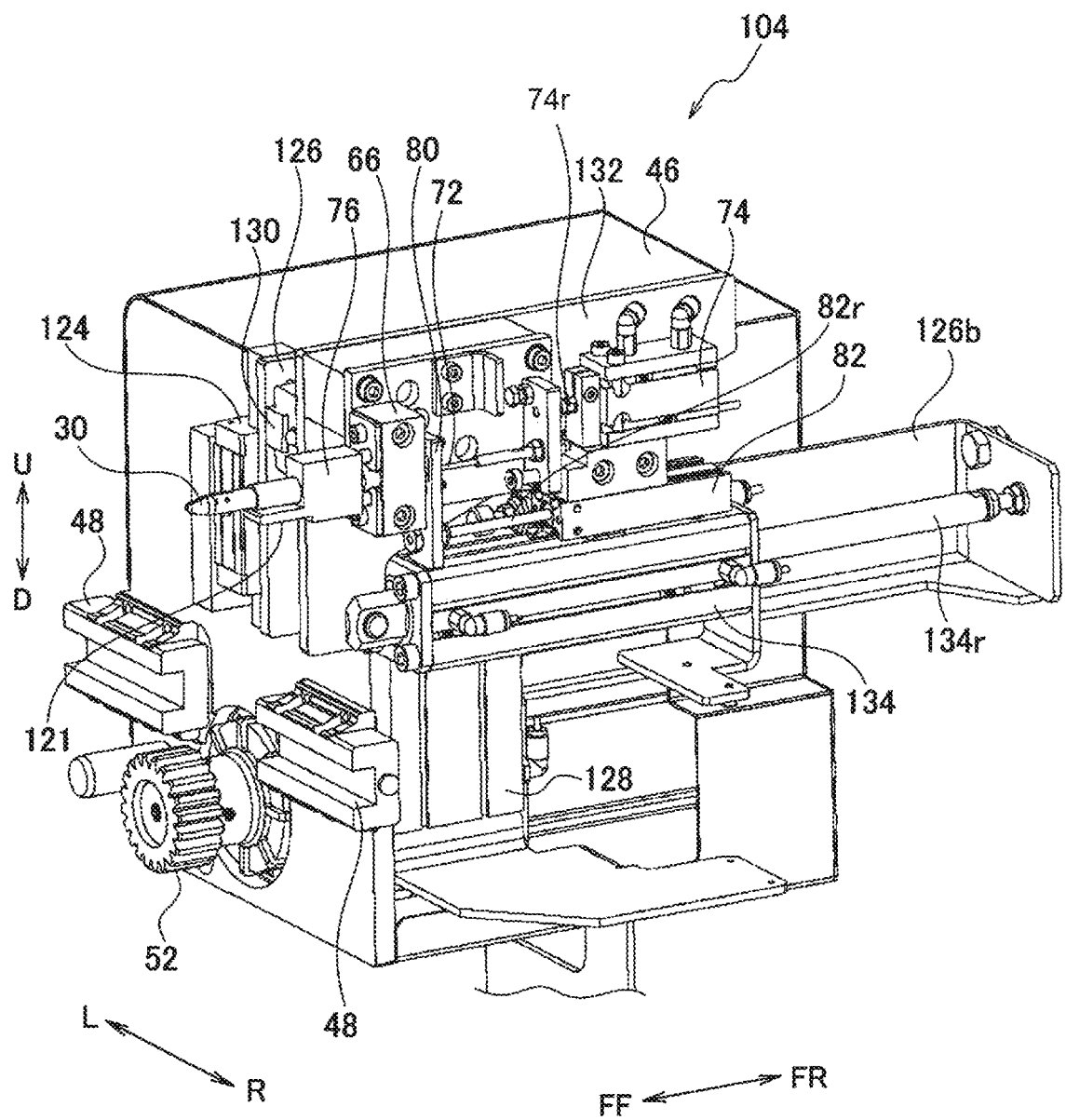
FIG. 25 is a perspective view of the tool changer according to the second embodiment.

As shown in FIG. 25, a first slider 46 that is movable in the right-left direction is provided behind (on a back surface side of) the lower table 110 (see FIG. 19 to FIG. 21) via a beam member (not shown) and a plurality of linear sliders 48. A guide member 124 extending in an up-down direction is provided on a right side of the first slider 46. A vertical slider 126 that is slidable in the up-down direction is attached to the guide member 124 The vertical slider 126 includes a bracket 126*h* in a rear part thereof. At a suitable position of the first slider 46, a hydraulic cylinder 128 is provided as an actuator that slides the vertical slider 126 (relative to the first slider 46) in the up-down direction. Thus, the hydraulic cylinder 128 is driven, so that the vertical slider 126 may slide relative to the first slider 46 in the up-down direction.

A guide member 130 extending in the front-rear direction is attached to the vertical slider 126. The guide member 130 is provided with a second slider 132 that is movable in the front-rear direction. As shown in FIG. 19 to FIG. 21 and FIG. 25, at a suitable position of the second slider 132, a hydraulic cylinder 134 is provided as an actuator that slides the second slider 132 (relative to the vertical slider 126) in the front-rear direction. The hydraulic cylinder 134 includes a piston rod 134*r*, and a rear end of the piston rod 134*r* is connected to the bracket 126*b* of the vertical slider 126. Thus, the hydraulic cylinder 134 is driven, so that the second slider 132 may slide relative to the vertical slider 126 in the front-rear direction.

The tool changer 104 does not include a member corresponding to the third slider 62 (see FIG. 2) in the first embodiment, and a support block 66 is fixed to the second slider 132. As shown in FIG. 19 to FIG. 22 and FIG. 25, the finger 30 that supports the lower tool 108 protrudes forward from a front surface of the support block 66. The finger 30 extends in the front-rear direction, and may be inserted into the engagement hole 112*h* of the lower tool 108. The finger 30 includes a large-diameter portion 30*a* on a base end side thereof, and includes, on a tip side thereof, a small-diameter portion 30*b* that is insertable into the engagement hole 112*h*. A tip (a front end) of the finger 30 is formed in a tapered shape. At an intermediate position of the finger 30 to boundary between the large-diameter portion 30*a* and the small-diameter portion 30*b*), an outer stepped portion 30*c* that is abuttable on the tool main body 112 is formed.

In a slit 30*s* of the finger 30, the engagement piece 32 that is swingable in the up-down direction is provided. The engagement piece 32 protrudes from an outer peripheral surface of the finger 30, to engage with the peripheral edge portion of the engagement hole 112*h* or the inner stepped portion 112*hc* of the engagement hole 112*h*. Furthermore, a hydraulic cylinder 74 that swings the engagement piece 32 in the up-down direction is provided at a suitable position of the second slider 132.

The flat-plate aped anti-rotation member 118 that prevents rotation of the lower tool 108 supported by the finger 30 is attached to a front surface of a slide block 76. In other words, the anti-rotation member 118 that movable in the front-rear direction is provided in the large-diameter portion 30*a* of the finger 30 via the slide block 76. The upper surface of the anti-rotation member 118 may come in surface contact with the lower surface (the stepped surface) of the tool main body 112 of the lower tool 108A (see FIG. 19). The lower surface of the anti-rotation member 118 may come in surface contact with the upper surface (the stepped surface) of the attachment portion 114 of the lower tool 108B (see FIG. 20). The tip of the anti-rotation member 118 may engage in the anti-rotation depressed on 112*d* of the lower tool 108C (see FIG. 21). Furthermore, a hydraulic cylinder 82 to move the anti-rotation member 118 in the front-rear direction is provided at a suitable position of the second slider 132.

Note that in a case where a cross-sectional shape of the engagement hole 112*h* is polygonal, and a cross-sectional shape of the small-diameter portion 30*b* of the finger 30 is also a polygonal shape corresponding to the cross-sectional shape of the engagement hole 112*h*, the anti-rotation member 118 can be omitted. That is, the finger 30 may function as an anti-rotation member.

Subsequently, advantages of the second embodiment will be described.

Upon releasing the pressing operation of the clamp 122, the first slider 46 is moved in the right-left direction, and the finger 30 is opposed to the engagement hole 112*h*. Next, the second slider 132 moves forward to insert the finger 30 into the engagement hole 112*h*. The outer stepped portion 30*c* of the finger 30 abuts on the peripheral edge portion of the engagement hole 112*h* of the lower tool 108 or the inner stepped portion 112*hc* of the engagement hole 112*h*. The engagement piece 32 protrudes from the outer peripheral surface of the finger 30, to engage with the peripheral edge portion of the engagement hole 112h. Consequently, the lower tool 108 is clamped between the engagement piece 32 and the outer stepped portion 30c of the finger 30. Next, the anti-rotation member 118 is moved forward integrally with the slide block 76, and the upper surface of the anti-rotation member 118 comes in surface contact with the lower surface of the tool main body 112 (the lower surface of the anti-rotation member 118 comes in surface contact with the upper surface of the attachment portion 114, or the tip of the anti-rotation member 118 engages in the anti-rotation depressed portion 112d of the lower tool 108C). As a result, the lower tool 108 is supported by the finger 30 in a non-rotatable state to the finger 30. Then, the vertical slider 126 is moved upward, so that the lower tool 108 is removed from the lower tool holder 106 (the lower table 110) while keeping a vertical posture.

In a case where the lower tool 108 is installed to the lower tool holder 106, an operation reverse to the above operation as performed. In this way, the lower tool 108 can be automatically changed (installed and removed) for the lower tool holder 106.

Also, a case where the lower tool 108 is automatically changed for the lower stocker of the tool storage, a similar operation is performed. Consequently, the lower tool 108 can be automatically changed between the lower tool holder 106 and the lower stocker.

As described above, the finger 30 is insertable into the engagement hole 112h of the lower tool 108, and the engagement piece 32 is capable of being protruded and retracted relative to the tip-side outer peripheral surface of the finger 30. Furthermore, the tool changer 104 includes the anti-rotation member 118 that prevents the rotation of the lower tool 108 supported by the finger 30. Consequently, in a state where the finger 30 is inserted into the engagement hole 112h of the lower tool 108 to engage the engagement piece 32 the peripheral edge portion of the engagement hole 112h of the lower tool 108 or the inner stepped portion 112hc of the engagement hole 112h, the anti-rotation member 118 prevents the rotation of the lower tool 108. As a result, the posture of the lower tool 108 to the finger 30 can be stabilized while inhibiting the rotation of the lower tool 108. According to the tool changer 104, even if the lower tool 108 is not provided with a member corresponding to an operation member extending in a vertical direction (a direction along a height of the lower tool 108) (see Patent Literatures 1 and 2) or an elongated hole, the lower tool 108 can be automatically changed for the lower tool holder 106 by the tool changer 104.

Therefore, according to the second embodiment, the height of the lower tool 108 to be automatically changed is set to about the same as a height of a usual lower tool no shown), and the usual lower tool is post-processed. Consequently, the tool can be used as the lower tool 108. Furthermore, difficulty in production of the lower tool 108 to be automatically changed is eliminated, while production time for the lower tool 108 can be shortened. That is, the lower tool 108 of the second embodiment is easy to be produced (can be produced also by modifying the existing tool) and is suitable for the automatic change. Then, according to the tool changer 104 of the second embodiment, the tool that is easy to produce can be suitably changed automatically.

The present invention is not limited to the above embodiments, and can be embodied, for example, in various aspects as follows. The tip portion of the finger 30 may be formed in a cylindrical shape, and in the tip portion of the finger 30, a slit extending in the front-rear direction may be formed. In this case, if a tapered push rod is pushed into the finger 30, an outer diameter of the tip portion of the finger 30 is enlarged, and the tip portion presses the inner peripheral surface of the engagement hole 18h (112h). As a result, the tool 14 (108) is supported in the non-rotatable state by the finger 30.

The first slider 46 that is movable in the right-left direction may be provided in front of (on a front surface side of), instead of behind (on a back surface side of), the upper table 16 (the lower table 110). In other words, the tool changer 10 may be disposed in front of, instead of behind, the upper table 16. Similarly, the tool changer 104 may be disposed in front of, instead of behind, the lower table 110.

The engagement piece 32 as the engagement member may be omitted. In this case, at the correspondent position, in the lateral direction, in the tool main body 18 to the gravity-center position GP, the hole 18h (see FIG. 4 to FIG. 6) having the circular cross-sectional shape, into which the finger 30 is inserted, extends through the post in the thickness direction. Similarly, at the correspondent position, in the lateral direction, in the tool main body 112 to the gravity-center position GP, the hole 112h (see FIG. 22 to FIG. 24) having the circular cross-sectional shape, into which the finger 30 is inserted, extends through the position in the thickness direction. The tool 14 or 108 is not engaged with the engagement piece 32, but according to a relation between the gravity-center position GP and the position of the hole 18h or 112h, the rotation of the tool 14 or 108 is inhibited.

All contents of Japanese Patent Application Nos. 2018-134151 (filed on Jul. 17, 2018), 2018-134168 (filed on Jul. 17, 2018), 2018-140886 (filed on Jul. 27, 2018), 2018-169366 (filed on Sep. 11, 2018), 2019-87437 (filed on May 7, 2019), 2019-92892 (filed on May 16, 2019), 2019-109717 (filed on Jun. 12, 2019), 2019-111277 (filed on Jun. 14, 2019), and 2019-126935 (filed on Jul. 8, 2019) are referred to herein and accordingly fully incorporated herein. The present invention has been described above with reference to the embodiments of the present invention, but the present invention is not limited to the above embodiments. The scope of the present invention is determined in the context of claims.

The invention claimed is:

1. A tool changer comprising:
   a slider configured to be provided on a surface of a table of a press brake, and configured to slide in a right-left direction along a tool installation part of the table,
   a finger provided in the slider, configured to be inserted into an engagement hole extending through a tool and to move in a front-rear direction, the front-rear direction being perpendicular to the surface of the table of the press brake, and the finger being configured to support the tool,
   an engagement member configured to be swingable such that it may be protruded and retracted relative to an outer peripheral surface of the finger at a tip end of the finger, and to be engaged with a peripheral edge of the engagement hole of the tool or with an inner stepped portion formed within the engagement hole of the tool, and
   an operation rod that is provided in the finger so as to be movable in the front-rear direction and is configured to push and pull the engagement member to swing the engagement member,
   wherein the finger includes:
   a larger-diameter portion that is formed at a base end of the finger, a smaller-diameter portion that is formed at the tip end of the finger and has a diameter smaller than a diameter of the larger-diameter portion, the smaller-diameter portion being configured to be inserted into the engagement hole of the tool, and an outer stepped portion that is formed at a boundary between the larger-diameter portion and the smaller-diameter portion and is configured to abut on the tool, and wherein the finger is configured to clamp the tool between: (a) the engagement member that is protruded from the outer peripheral surface of the finger and (b) the outer stepped portion when the finger has been inserted into the engagement hole of the tool and then the engagement member has been protruded from the outer peripheral surface of the finger.

2. The tool changer according to claim 1, wherein the engagement member is provided to be swingable in an up-down direction, in a slit formed at the tip end of the finger.

3. The tool changer according to claim 2, wherein the engagement member is an engagement piece that is swingably attached in the slit via a pivot pin to be capable of being protruded and retracted relative to the outer peripheral surface of the finger.

4. The tool changer according to claim 3, wherein the operation rod is provided with a cutout in which a tip of the engagement piece is intruded, and the cutout has a push face that pushes the engagement piece forward to swing the engagement piece downward, and a pull face that pulls the engagement piece rearward to swing the engagement piece upward.

5. The tool changer according to claim 1, further comprising:

a slide block that is slidable relative to the finger in the front-rear direction while being guided by the finger, and an anti-rotation member that is attached to the slide block and is configured to prevent rotation of the tool supported by the finger, wherein a tip end of the anti-rotation member is engageable in an anti-rotation depressed portion formed in the tool, wherein the anti-rotation member presses the tool toward the engagement member that is protruded from the outer peripheral surface of the finger, and wherein the anti-rotation member is movable integrally with the slide block in the front-rear direction.

6. The tool changer according to claim 5, wherein an additional anti-rotation member is provided, and wherein a tip end of the additional anti-rotation member is engageable in a corresponding additional anti-rotation depressed portion of the tool.

7. The tool changer according to claim 6, wherein the anti-rotation members are arranged in a linearly symmetrical manner to a virtual vertical line passing an axial center of the finger.

8. The tool changer according to claim 1, wherein an anti-rotation member that is configured to prevent rotation of the tool supported by the finger is formed in a flat plate shape, and is surface-contactable with the tool.

9. The tool changer according to claim 1, wherein an anti-rotation member that is configured to prevent rotation of the tool supported by the finger is contactable with the tool supported by the finger from one side in the right-left direction.

10. The tool changer according to claim 1, wherein an anti-rotation member that is configured to prevent rotation of the tool supported by the finger is contactable with a tip of the tool supported by the finger.

* * * * *